(12) United States Patent
Chen et al.

(10) Patent No.: US 11,011,057 B2
(45) Date of Patent: May 18, 2021

(54) SYSTEMS AND METHODS FOR GENERATING PERSONALIZED DESTINATION RECOMMENDATIONS

(71) Applicant: BEIJING DIDI INFINITY TECHNOLOGY AND DEVELOPMENT CO., LTD., Beijing (CN)

(72) Inventors: Ran Chen, Beijing (CN); Huan Chen, Beijing (CN); Qi Song, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/083,278

(22) Filed: Oct. 28, 2020

(65) Prior Publication Data

US 2021/0043086 A1 Feb. 11, 2021

Related U.S. Application Data

(63) Continuation of application No. PCT/CN2018/090387, filed on Jun. 8, 2018.

(51) Int. Cl.
*G06N 20/00* (2019.01)
*G08G 1/0968* (2006.01)
(Continued)

(52) U.S. Cl.
CPC ... *G08G 1/096888* (2013.01); *G01C 21/3484* (2013.01); *G01C 21/3617* (2013.01); *G06N 5/003* (2013.01)

(58) Field of Classification Search
CPC .. G06F 16/9535; G06F 16/285; G06F 16/337; G06N 20/00; G06N 3/02;
(Continued)

(56) References Cited

U.S. PATENT DOCUMENTS 9,235,278 B1   1/2016 Cheng et al.
2010/0299177 A1* 11/2010 Buczkowski .......... G06Q 50/30
                                                          705/7.13
(Continued)

FOREIGN PATENT DOCUMENTS

CN       105183800 A    12/2015
CN       105631711 A     6/2016
(Continued)

OTHER PUBLICATIONS

International Search Report in PCT/CN2018/090387 dated Mar. 8, 2019, 4 pages.
(Continued)

*Primary Examiner* — Dalena Tran
(74) *Attorney, Agent, or Firm* — Metis IP LLC

(57) ABSTRACT

Methods and systems for generating a trained destination prediction model are provided. The method may include obtaining a plurality of historical orders corresponding to a plurality of users and determining a plurality of first features and a plurality of second features associated with the plurality of historical orders. The method may further include determining a plurality of transformed features based on the plurality of first features and a plurality of sets of cross features by correlating the plurality of second features. The method may further include obtaining a preliminary destination prediction model and training the preliminary destination prediction model to obtain a trained destination prediction model based on the plurality of transformed features and the plurality of sets of cross features.

20 Claims, 11 Drawing Sheets

(51) Int. Cl.
*G06N 5/00* (2006.01)
*G01C 21/34* (2006.01)
*G01C 21/36* (2006.01)

(58) Field of Classification Search
CPC ...... G06N 7/005; H04W 40/02; H04W 48/04; H04W 64/00; H04W 4/025; H04W 4/44; G08G 1/166; G08G 1/20; G08G 1/096888
USPC ....... 701/424; 707/784, 737; 705/26.7, 7.13; 706/50
See application file for complete search history.

(56) References Cited

U.S. PATENT DOCUMENTS

| | | | |
|---|---|---|---|
| 2012/0190339 A1* | 7/2012 | Abe | H04W 52/0258 455/411 |
| 2013/0159028 A1* | 6/2013 | Lerenc | G06Q 10/1095 705/5 |
| 2015/0339700 A1 | 11/2015 | Huo et al. | |
| 2015/0379427 A1* | 12/2015 | Dirac | G06N 20/00 706/12 |
| 2016/0253598 A1 | 9/2016 | Yamada et al. | |
| 2017/0017886 A1 | 1/2017 | Gao et al. | |
| 2017/0046431 A1 | 2/2017 | Zitouni et al. | |
| 2017/0177309 A1 | 6/2017 | Bar-Or et al. | |
| 2018/0181910 A1 | 6/2018 | Zhang et al. | |
| 2019/0121350 A1* | 4/2019 | Cella | H04L 67/12 |

FOREIGN PATENT DOCUMENTS

| | | |
|---|---|---|
| CN | 106447114 A | 2/2017 |
| CN | 106530188 A | 3/2017 |
| CN | 107992530 A | 5/2018 |
| CN | 108108831 A | 6/2018 |
| EP | 3188087 A1 | 7/2017 |
| WO | 2017028821 A | 2/2017 |

OTHER PUBLICATIONS

Written Opinion in PCT/CN2018/090387 dated Mar. 8, 2019, 4 pages.

* cited by examiner

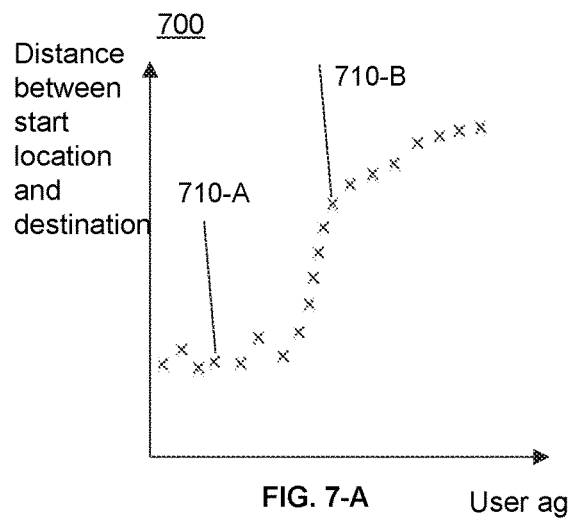
FIG. 7-A
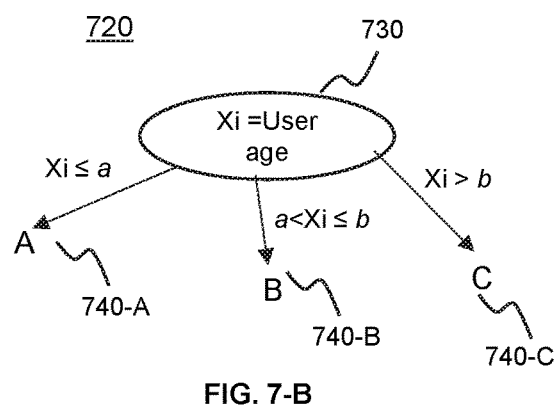
FIG. 7-B
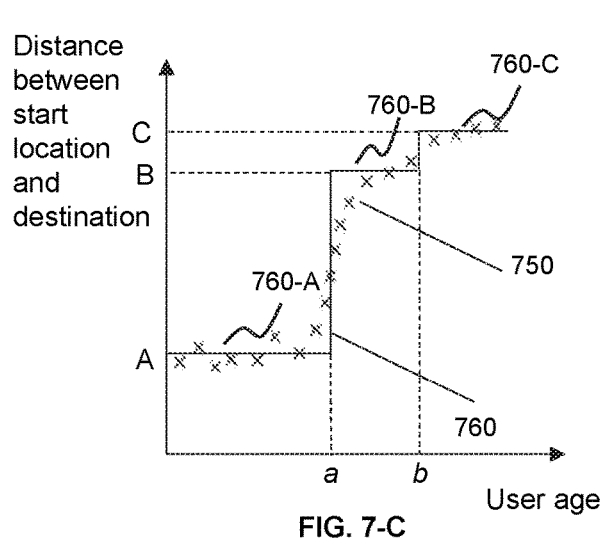
FIG. 7-C
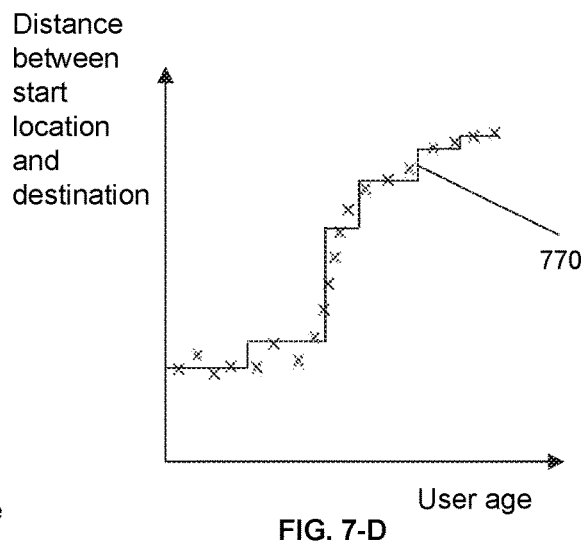
FIG. 7-D
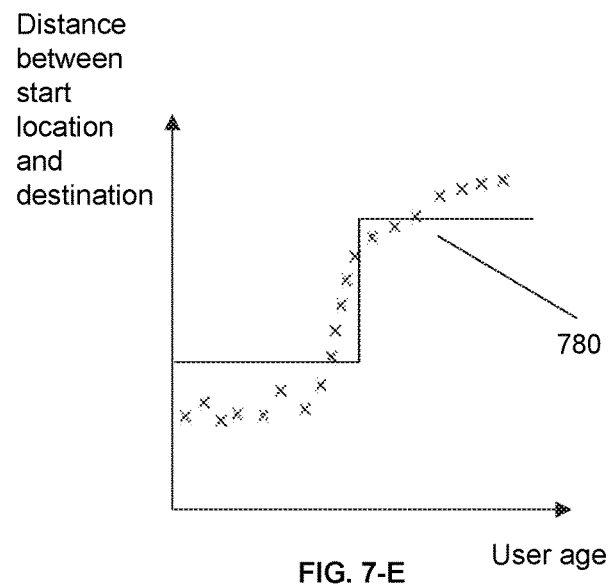
FIG. 7-E

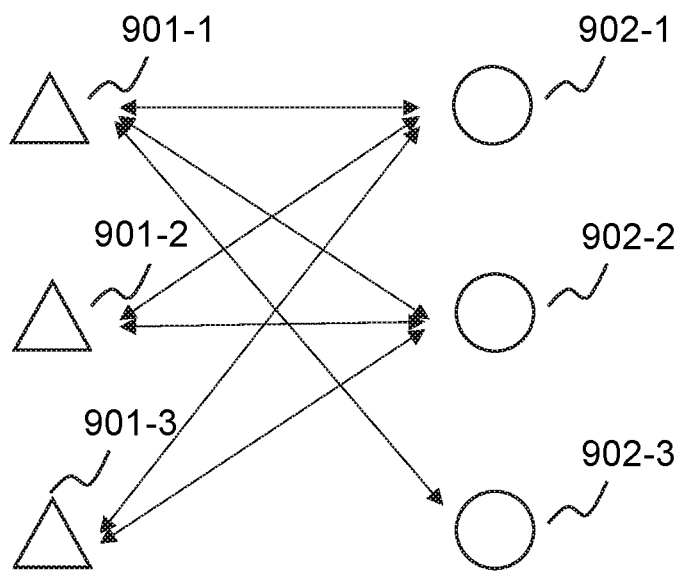
FIG. 9-A
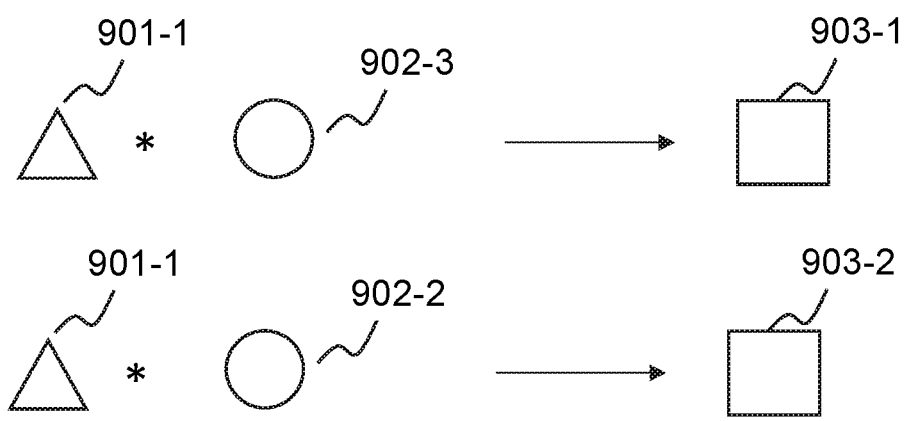
FIG. 9-B

SYSTEMS AND METHODS FOR GENERATING PERSONALIZED DESTINATION RECOMMENDATIONS

CROSS-REFERENCE TO RELATED APPLICATIONS

This application is a continuation of International Application No. PCT/CN2018/090387, filed on Jun. 8, 2018, the contents of which are incorporated herein by reference.

TECHNICAL FIELD

The present disclosure generally relates to systems and methods for providing destination recommendations, and in particular, systems and methods for generating personalized destination recommendations using a destination prediction model.

BACKGROUND

Online-to-offline services, such as online taxi-hailing services are becoming increasingly popular in people's daily lives. Usually, a service requester (e.g., a passenger) may initiate an online-to-offline request by entering a destination in an online-to-offline service providing application (e.g., Didi App) installed in his or her smartphone. A service provider (e.g., a driver) may accept the online-to-offline request and drive the service requester to his or her destination. The service requester may have to manually enter the destination in the online-to-offline service providing application each time when he or she initiates the online-to-offline request. This can be both time consuming and inconvenient. Therefore, it is desirable to provide systems and methods for generating a personalized destination recommendation for the service requester.

SUMMARY

According to an aspect of the present disclosure, a method is provided. The method may be implemented on a computing device having at least one storage device storing a set of instructions for generating a trained destination prediction model, and at least one processor in communication with the at least one storage device. The method may include obtaining, by the at least one processor, a plurality of historical orders corresponding to a plurality of users. Each of the plurality of users may correspond to at least one of the plurality of historical orders. The method may further include determining, by the at least one processor, a plurality of first features associated with the plurality of historical orders and a plurality of second features associated with the plurality of historical orders. The method may further include determining, by the at least one processor, a plurality of transformed features based on the plurality of first features using a statistics-based technique and a plurality of sets of cross features by correlating the plurality of second features. Each of the plurality of sets of cross features may be associated with one of the plurality of users and determined based on the corresponding at least one historical order. The method may further include obtaining, by the at least one processor, a preliminary destination prediction model and training, by the at least one processor, the preliminary destination prediction model to obtain a trained destination prediction model based on the plurality of transformed features and the plurality of sets of cross features using a linear classifier.

In some embodiments, the plurality of first features may be dense features and the plurality of second features may be sparse features.

In some embodiments, the method may further include obtaining information of a current user, and determining a candidate destination for the current user according to the destination prediction model based on the information of the current user.

In some embodiments, the information of the current user may include a user identification (ID) and a current location of the current user.

In some embodiments, the method may further include obtaining a real destination corresponding to the each of the plurality of historical orders. The method may further include generating a plurality of positive training samples and a plurality of negative training samples. Each of the plurality of positive training samples may have a same destination as the real destination, a transformed feature and a set of cross features. Each of the plurality of negative training samples may have a different destination from the real destination, a transformed feature and a set of cross features. The processor may train the destination prediction model based on the plurality of positive training samples and the plurality of negative training samples.

In some embodiments, the plurality of transformed features may include at least one of: a distance between a start location and a destination, a time point, a time length of each of the plurality of historical orders, a frequency of visiting of each location in the plurality of historical orders, or a probability of selecting each location in the plurality of historical orders as a real destination.

In some embodiments, the each of the plurality of sets of cross features may be associated with a user ID of the corresponding user and at least one destination ID corresponding to the at least one historical orders associated with the user.

In some embodiments, the determination of each of the plurality of sets of cross features may include: determining a user ID of the corresponding user; determining at least one destination ID corresponding to the at least one historical orders associated with the user; and correlating the user ID with the at least one destination ID of the user to generate a set of cross features.

In some embodiments, the statistics-based technique may include at least one of a gradient boosting decision tree (GBDT) model, a random forest (RF) model, or an XGboost model.

In some embodiments, the linear classifier may include a logistic regression (LR) model.

According to another aspect of the present disclosure, a system is provided. The system may include a storage device storing a set of instructions, and at least one processor of an online-to-offline service platform configured to communicate with the storage device. When the storage device executes the set of instructions, the at least one processor may be configured to cause the system to obtain a plurality of historical orders corresponding to a plurality of users. Each of the plurality of users may correspond to at least one of the plurality of historical orders. The at least one processor may be further configured to cause the system to determine a plurality of first features associated with the plurality of historical orders and a plurality of second features associated with the plurality of historical orders. The at least one processor may be further configured to cause the system to determine a plurality of transformed features based on the plurality of first features using a statistics-based technique. The at least one processor may be further configured to cause the system to determine a plurality of sets of cross features by correlating the plurality of second features. Each of the plurality of sets of cross features may be associated with one of the plurality of users and determined based on the corresponding at least one historical order. The at least one processor may be further configured to cause the system to obtain a preliminary destination prediction model. The at least one processor may be further configured to cause the system to train the preliminary destination prediction model to obtain a trained destination prediction model based on the plurality of transformed features and the plurality of sets of cross features using a linear classifier.

According to another aspect of the present disclosure, a non-transitory machine-readable storage medium may include instructions. When the accessed by at least one processor of an online-to-offline service platform, the non-transitory machine-readable storage medium including instructions may cause the at least one processor to obtain a plurality of historical orders corresponding to a plurality of users. Each of the plurality of users may correspond to at least one of the plurality of historical orders. The non-transitory machine-readable storage medium including instructions may cause the at least one processor to determine a plurality of first features associated with the plurality of historical orders and a plurality of second features associated with the plurality of historical orders. The non-transitory machine-readable storage medium including instructions may cause the at least one processor to determine a plurality of transformed features based on the plurality of first features using a statistics-based technique. The non-transitory machine-readable storage medium including instructions may cause the at least one processor to determine a plurality of sets of cross features by correlating the plurality of second features. Each of the plurality of sets of cross features may be associated with one of the plurality of users and determined based on the corresponding at least one historical order. The non-transitory machine-readable storage medium including instructions may cause the at least one processor to obtain a preliminary destination prediction model. The non-transitory machine-readable storage medium including instructions may cause the at least one processor to train the preliminary destination prediction model to obtain a trained destination prediction model based on the plurality of transformed features and the plurality of sets of cross features using a linear classifier.

According to another aspect of the present disclosure, a system for generating a trained destination prediction model is provided. The system may include an acquisition module, a feature generating module, and a model training module. The acquisition module may be configured to obtain a plurality of historical orders corresponding to a plurality of users. Each of the plurality of users may correspond to at least one of the plurality of historical orders. The feature generating module may be configured to determine a plurality of first features associated with the plurality of historical orders and a plurality of second features associated with the plurality of historical orders. The feature generating module may be further configured to determine a plurality of transformed features based on the plurality of first features using a statistics-based technique and determine a plurality of sets of cross features by correlating the plurality of second features. Each of the plurality of sets of cross features may be associated with one of the plurality of users and determined based on the corresponding at least one historical order. The model training module may be configured to obtain a preliminary destination prediction model and train the preliminary destination prediction model to obtain a trained destination prediction model based on the plurality of transformed features and the plurality of sets of cross features using a linear classifier.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7-B is a schematic diagram illustrating the structure of an exemplary tree model according to some embodiments of the present disclosure FIG. 7-C, FIG. 7-D and FIG. 7-E are schematic diagrams illustrating exemplary training data of models and trained models according to some embodiments of the present disclosure;

FIG. 9-A is a schematic diagram illustrating exemplary correlations between a plurality of features according to some embodiments of the present disclosure;

FIG. 9-B is a schematic diagram illustrating exemplary cross features according to some embodiments of the present disclosure;

DETAILED DESCRIPTION

Figure 1:
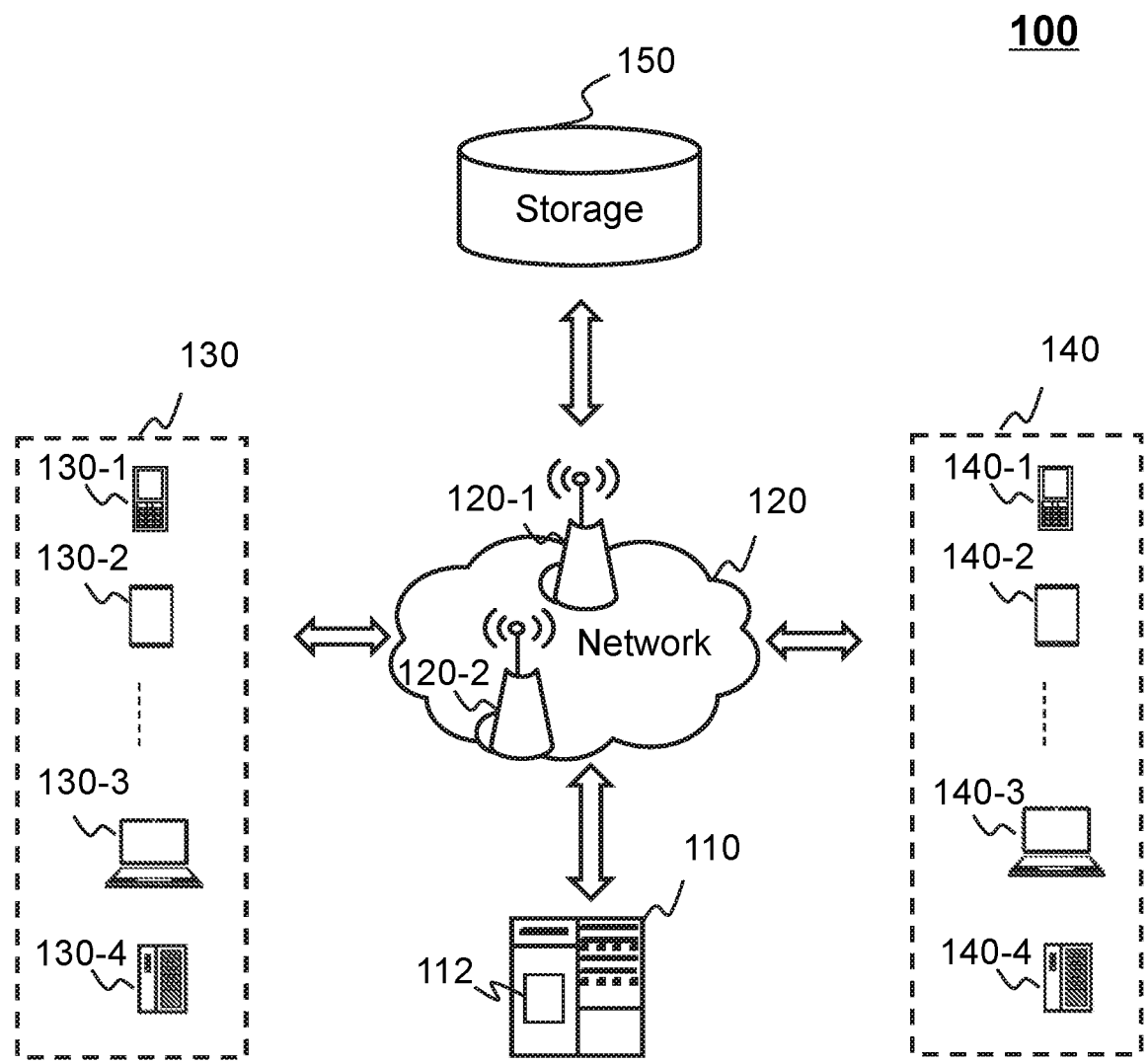
FIG. 1 is a schematic diagram illustrating an exemplary online-to-offline service system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding online-to-offline service, it should also be understood that this is only one exemplary embodiment. The system or method of the present disclosure may be applied to any other kind of online-to-offline service. For example, the system or method of the present disclosure may be applied to different transportation systems including land, ocean, aerospace, or the like, or any combination thereof. The vehicle of the transportation systems may include a taxi, a private car, a hitch, a bus, a driverless vehicle, or the like, or any combination thereof. The transportation system may also include any transportation system that applies management and/or distribution, for example, a system for transmitting and/or receiving an express. The application scenarios of the system or method of the present disclosure may include a web page, a plug-in of a browser, a client terminal, a custom system, an internal analysis system, an artificial intelligence robot, or the like, or any combination thereof.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for training a destination prediction model. In some embodiments, a plurality of historical orders corresponding to a plurality of users may first be obtained as training samples and/or testing samples for training and/or testing the model. Each of the plurality of users may correspond to at least one of the plurality of historical orders. Features associated with the plurality of historical orders may then be determined. The features may include a plurality of dense features and a plurality of sparse features, which may further be used to obtain a plurality of transformed features and a plurality of sets of cross features (also referred to as cross-feature sets), respectively. The cross features are also known as combined features. The cross features (or combined features) may correspond to correlations between two or more different features. A sparse feature may be a feature in which most of the elements of the feature are zeros, while a dense feature may be a feature in which most of the elements of the feature are not zero. In some embodiments, a feature may be designated as a dense feature or a sparse feature according to the density (or the sparsity) of the feature. The density of the feature may be defined as the number of non-zero elements of the feature (or the matrix corresponding to the feature) divided by the total number of the elements of the feature (or the matrix corresponding to the feature). The sparsity of the feature may be defined as the number of zero-valued elements of the feature (or the matrix corresponding to the feature) divided by the total number of elements of the feature (or the matrix corresponding to the feature). The sum of the sparsity and the density of a feature may be 1. For example, a feature may be designated as a sparse feature if the sparsity of the feature is greater than a sparsity threshold (or the density of the feature is less than a density threshold). A feature may be designated as a dense feature if the sparsity of the feature is less than or equal to the sparsity threshold (or the density of the feature is greater than or equal to the density threshold). Merely by way of example, the sparsity threshold may be any numerals between 0 and 1, such as 0.95, 0.80, 0.65, 0.50, 0.35, 0.20, 0.05, etc. Accordingly, the density threshold may be 0.05, 0.20, 0.35, 0.05, 0.65, 0.80, 0.95, etc. Exemplary transformed features may include the distance between a start location and a destination, a time point, the time length of each of the plurality of historical orders, the frequency of visiting of each location in the plurality of historical orders, probability of selecting each location in the plurality of historical orders as a real destination, or the like, or any combination thereof. Exemplary cross-feature sets may include a cross feature related to a destination ID and a start location ID, a cross feature related to a destination ID and a starting time, a cross feature related to a destination ID, a start location ID and a starting time, or the like, or a combination thereof. A preliminary destination prediction model may be obtained and trained using the training samples based on the transformed features and the cross-feature sets, and a trained destination prediction model may be generated accordingly. The trained destination prediction model may be used to generate one or more destinations for a user when the user initiates an online-to-offline service request for an application on his or her mobile device. The systems and methods disclosed in the present application may suggest a destination according to a user's profile and order history when the user initiates a service request, which may alleviate the user's burden to enter the destination manually via an input device. Further, the systems and methods disclosed in the present application use various machine learning techniques, such as constructing novel features, to implement the functions disclosured herein, which may reduce the computing requirement for predicting a destination.

FIG. 1 is a schematic diagram of an exemplary online-to-offline service system 100 according to some embodiments of the present disclosure. For example, the online-to-offline service system 100 may be an online transportation service platform for transportation services such as taxi hailing, chauffeur services, food ordering and catering services, food delivery services, takeout services, delivery vehicles, carpool, bus service, driver hiring, and shuttle services. The online-to-offline service system 100 may be a platform including a server 110, a network 120, a requester terminal 130, a provider terminal 140, and a storage 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may be directly connected to the requester terminal 130, the provider terminal 140, and/or the storage 150 to access the stored information and/or data (e.g., via a cable or a port). In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2.

In some embodiments, the server 110 may include a processing engine 112. The processing engine 112 may process information and/or data relating to a service request to perform one or more functions described in the present disclosure. For example, the processing engine 112 may obtain a plurality of historical orders corresponding to a plurality of users from the provider terminal(s) 140 and/or the storage 150 and train a destination prediction model. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the online-to-offline service system 100 (e.g., the server 110, the requester terminal 130, the provider terminal 140, and the storage 150) may transmit information and/or data to another component (s) in the online-to-offline service system 100 via the network 120. For example, the server 110 may receive a historical order from the requester terminal 130, provider terminal 140, and/or the storage 150 via the network 120. In some embodiments, the network 120 may be any type of wired or wireless network, or a combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online-to-offline service system 100 may be connected to the network 120 to exchange data and/or information between them.

In some embodiments, a requester may be a user of the requester terminal 130. In some embodiments, the user of the requester terminal 130 may be someone other than the requester. For example, a user A of the requester terminal 130 may use the requester terminal 130 to transmit a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smartwatch, a smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of the requester and/or the requester terminal 130. For example, the requester terminal 130 may include a GPS unit (e.g., GPS microchip or chipset) configured to determine GPS information relating to the location of requester terminal 130. The requester terminal 130 may transmit the GPS information determined by the GPS unit to the server 110.

In some embodiments, the provider terminal 140 may be similar to or the same as the requester terminal 130. In some embodiments, the provider terminal 140 may be a device with positioning technology for locating the position of the provider and/or the provider terminal 140. For example, the provider terminal 140 may include a GPS unit (e.g., GPS microchip or chipset) configured to determine GPS information relating to the location of the provider terminal 140. The provider terminal 140 may periodically transmit the GPS information determined by the GPS unit to the server 110. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may transmit positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the online-to-offline service system 100 (e.g., the server 110, the requester terminal 130, the provider terminal 140). One or more components in the online-to-offline service system 100 may access the data or instructions stored in the storage 150 via the network 120. In some embodiments, the storage 150 may be directly connected to or communicate with one or more components in the online-to-offline service system 100 (e.g., the server 110, the requester terminal 130, the provider terminal 140). In some embodiments, the storage 150 may be part of the server 110.

In some embodiments, one or more components of the online-to-offline service system 100 (e.g., the server 110, the requester terminal 130, the provider terminal 140) may access the storage 150. In some embodiments, one or more components of the online-to-offline service system 100 may read and/or modify information relating to the requester, provider, and/or the public when one or more conditions are met. For example, the server 110 may read and/or modify one or more users' information after an online-to-offline service request is completed. As another example, the provider terminal 140 may access information relating to the requester when receiving a service request from the requester terminal 130, but the provider terminal 140 may not have the permission to modify the relevant information of the requester.

In some embodiments, the object related to the service request may be any product. In some embodiments, the product may be a tangible product or an intangible product. The tangible product may include food, medicine, commodity, chemical product, electrical appliance, clothing, car, housing, luxury, or the like, or any combination thereof. The intangible product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in the software of a mobile terminal, a program, a system, or the like, or any combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include an online-to-offline service providing application, a traveling software and/or application, a vehicle scheduling software and/or application, mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), or the like, or any combination thereof.

One of ordinary skill in the art would understand that when an element of the online-to-offline service system 100 performs, the element may perform through electrical signals and/or electromagnetic signals. For example, when a requester terminal 130 processes a task, such as making a determination, identifying or selecting an object, the requester terminal 130 may operate logic circuits in its processor to process such task. When the requester terminal 130 sends out a service request to the server 110, a processor of the requester terminal 130 may generate electrical signals encoding the service request. The processor of the requester terminal 130 may then send the electrical signals to an output port. If the requester terminal 130 communicates with the server 110 via a wired network, the output port may be physically connected to a cable, which may further transmit the electrical signals to an input port of the server 110. If the requester terminal 130 communicates with the server 110 via a wireless network, the output port of the requester terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requester terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
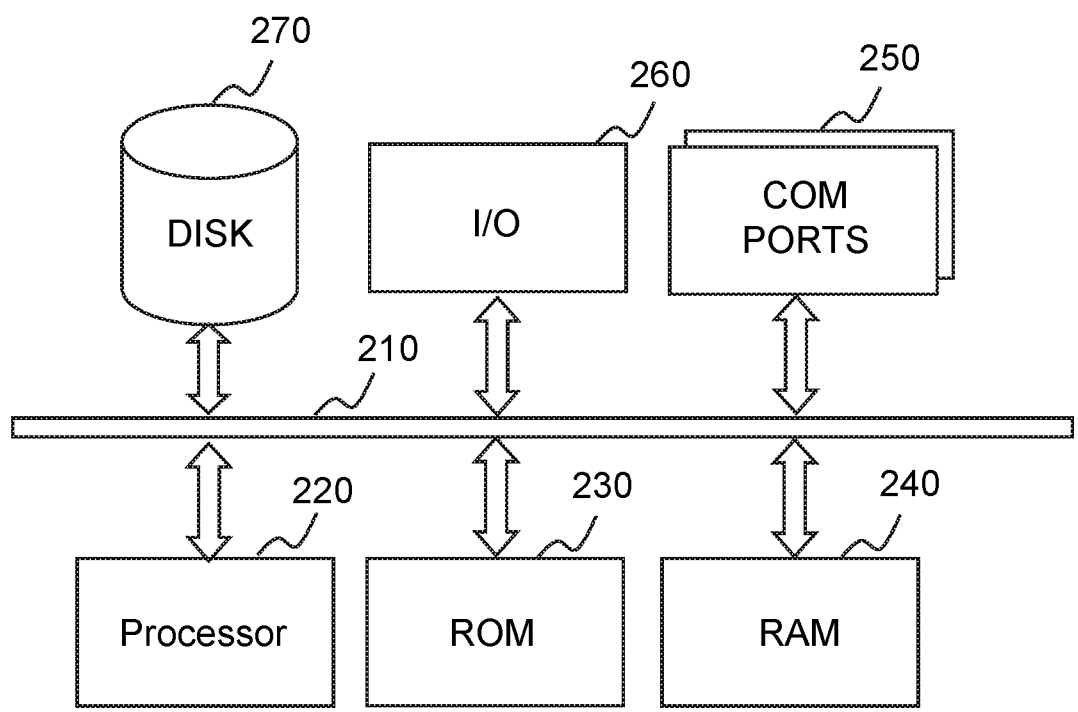
FIG. 2 is a schematic diagram illustrating hardware and/or software components of an exemplary computing device according to some embodiments of the present disclosure.

FIG. 2 is a schematic diagram illustrating hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the online-to-offline service system 100 as described herein. For example, the processing engine 112 may be implemented on the computing device 200, via its hardware, software program, firmware, or a combination thereof. Although only one such computer is shown, for convenience, the computer functions relating to the online-to-offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210. In some embodiments, the processor 220 may be configured to obtain a plurality of historical orders. The processor 220 may be further configured to obtain and/or determine a plurality of first features and second features based on the plurality of historical orders. The processor 220 may be further configured to determine a plurality of transformed features based on the plurality of first features using a statistics-based technique and determine a plurality of sets of cross features by correlating the plurality of second features and/or the plurality of first features. The processor 220 may be further configured to generate a trained destination prediction model based on the plurality of transformed features and the plurality of sets of cross features using a linear classifier.

The exemplary computing device may also include an internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
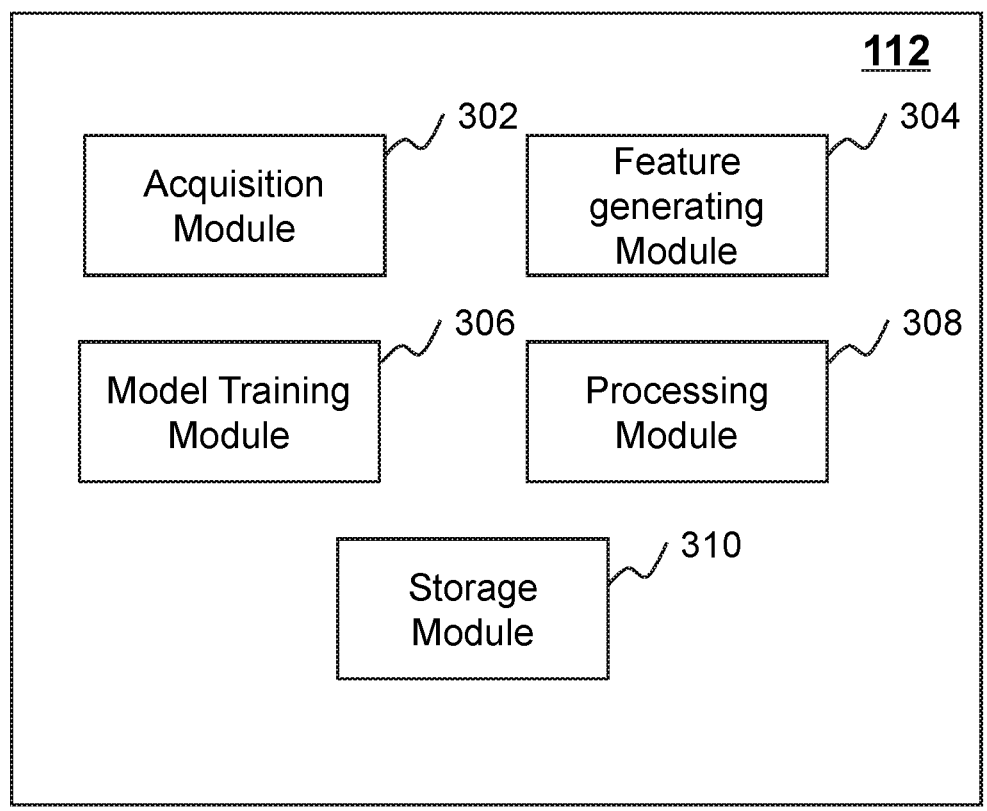
FIG. 3 is a block diagram illustrating an exemplary processing engine according to some embodiments of the present disclosure.

FIG. 3 is a block diagram illustrating an exemplary processing engine according to some embodiments of the present disclosure. The processing engine 112 may include an acquisition module 302, a feature generating module 304, a model training module 306, a processing module 308, and a storage module 310. Each module may be a hardware circuit that is designed to perform the following actions, a set of instructions stored in one or more storage media, and/or a combination of the hardware circuit and the one or more storage media.

The acquisition module 302 may be configured to obtain a plurality of service requests from one or more requesters. In some embodiments, a service request may be a request for an online-to-offline service (e.g., a transportation service, a goods delivery service). For example, if a passenger needs a taxi service, the passenger may send a taxi hailing request to the server 110 through the requester terminal 130 via the network 120. In some embodiments, the service request may be a request for a map navigation service. For example, a user may install a map navigation application on his or her mobile device. The processing engine 112 may determine an estimated destination based on a starting location of the user. The processing engine 112 may further generate and display a route from the starting location to the destination. The service request may include at least one of a start location, a destination, a time length between the time the service request being initiated and the time the service request being completed (or a traveling duration), a type of service, or the like, or any combination thereof. The acquisition module 302 may obtain the service request from the requester terminal 130 via the network 120.

The online-to-offline service may be an online-to-offline service that includes a taxi hailing service, a chauffeur service, an express car service, a food ordering and catering service, a food delivery service, a takeout service, a carpool service, a bus service, a short-term driver-renting service, a shuttle service, a test drive service, a designated driving service, or the like, or a combination thereof.

The acquisition module 302 may be further configured to obtain a plurality of historical orders (i.e., completed historical service requests) associated with a plurality of users. For example, once an online-to-offline service request sent by a requester is completed, the online-to-offline service system 100 may generate an order accordingly. The online-to-offline service system 100 may save the generated order in a storage (e.g., the storage 150). The order may include information associated with the service request, including but not limited to user information, route information, time information, and/or any other information associated with the historical request. As a further example, for a map navigation service, if a requester initiates a service request via the requester terminal 130, the online-to-offline service system 100 may recommend one or more destinations based on the service request. In some embodiments, after the requester confirming a recommended destination of the service request, the online-to-offline service system 100 may generate an order including information associated with the service request and/or the confirmed destination. In some embodiments, the online-to-offline service system 100 may generate an order even if the service request is not completed. Such order may be saved as uncompleted orders in the storage (e.g., the storage 150).

The feature generating module 304 may generate a plurality of features based on historical data related to the plurality of historical orders. The plurality of features may include a plurality of transformed features and a plurality of cross features. The transformed feature may include a distance between a start location and a destination, a time point, the a time length of each of the plurality of historical orders (e.g., the time length between the time a historical order being initiated and the time the historical order being completed), the frequency of visiting each location in the plurality of historical orders, the probability of selecting each location in the plurality of historical orders as a destination, or the like, or any combination thereof. The cross feature may include a cross feature related to a correlation between a user identification (ID) and a destination identification (ID), a cross feature related to a correlation between a destination ID and a start location identification (ID), a cross feature related to a correlation between a destination ID and a starting time, a cross feature related to a correlation between a destination ID, a start location ID and a starting time, or the like, or any combination thereof. The feature generating module 304 may transmit the generated features to the model training module 306 to be further processed.

In some embodiments, the feature generating module 304 may identify and/or extract the historical data based on the plurality of historical orders. For example, the feature generating module 304 may extract the historical data from the acquisition module 302, the requester terminal 130, the provider terminal 140 and/or storage 150 via the network 120 and record the historical data in the storage 150 or any component of the online-to-offline service system 100. The historical data related to a historical order may include a start location, a destination, user information (e.g., the age, the gender, the occupation), route information (e.g., the total distance(s) from the start location(s) to the destination(s), the road conditions), time information (e.g., the starting time, the actual time of arrival (ATA)), or the like, or any combination thereof.

The model training module 306 may be configured to train a preliminary destination prediction model based on the generated features to generate a trained destination prediction model. In some embodiments, the model training module 306 may first generate a plurality of sets of training samples based on the historical data. The model training module 306 may train the preliminary destination prediction model using the plurality of sets of training samples to generate the trained destination prediction model.

In some embodiments, each training sample may include one transformed feature associated with a historical order and a set of cross features associated with the historical order. Each set of the plurality of sets of training samples may include a set of positive training samples (e.g., a training sample assigned with a label "1") and a set of negative training samples (e.g., a training sample assigned with a label "0"). Detailed descriptions regarding the positive and negative training samples may be found elsewhere in the present disclosure (e.g., in connection with FIG. 6).

The model training module 306 may further update the trained destination prediction model. The trained destination prediction model may be updated based on updating data. The updating data may be associated with one or more new historical orders (e.g., historical orders newly recorded or obtained). The new historical orders may be the orders completed within a time period. The time period may be manually set by a user or automatically set by the processing engine 112. The time period may be a day, a week, a month, etc. Alternatively, a preset number of the latest historical orders (e.g., 100, 500, 1000, 10000) may be recorded. For example, the trained destination prediction model may be updated weekly based on the historical orders newly completed in each week.

In some embodiments, the trained destination prediction model (or the updated destination prediction model) may be stored in a storage device as an application or part thereof, which may be used in a user terminal (e.g., a requester terminal) or an online platform (e.g., a server). For example, the trained destination prediction model may be transmitted to a smartphone that may be used as a requester terminal for a navigation service, and the requester may log in the application to initiate a service request without inputting a destination. As another example, each update of the destination prediction model may correspond to a version. In some embodiments, different versions of the destination prediction model may be stored in an online database of the online-to-offline service system 100 (e.g., the storage 150). A user may access the online database of the online-to-offline service system 100 to download the latest version (or any version he or she wants) of the destination prediction model. The downloaded destination prediction model may be implemented by an online-to-offline service application installed on the user's device, to generate destination recommendations to the user. In some embodiments, the trained destination prediction model and/or the updated destination prediction model may be stored in a storage medium. For example, the trained destination prediction model and/or the updated destination prediction model may be stored in a non-transitory computer-readable storage medium (e.g., a flash disk), which may be used by online-to-offline service system 100 or a user terminal (e.g., a passenger terminal).

The processing module 308 may be configured to determine a destination for a service request based on the trained destination prediction model and/or the updated destination prediction model. For example, the processing module 308 may determine one or more candidate destinations for the service request. In some embodiments, the processing module 308 may further adjust the one or more candidate destinations for the service request dynamically based on a weather condition (e.g., haze or thunderstorm) or time information.

In some embodiments, the processing module 308 may cause the requester terminal to display the destination. For example, the processing module 308 may send one or more candidate destinations determined based on an online-to-offline service request to the requester terminal 130 via the network 120. The processing module 308 may determine a probability that the requester of the online-to-offline service request selecting each of the one or more candidate destinations as the destination of the online-to-offline service request by the trained destination prediction model (or the updated destination prediction model). The one or more candidate destinations may be ranked based on the probabilities determined. The processing module 308 may display at least one of the candidate destinations based on the ranking result.

The storage module 310 may store the historical orders, the set of transformed features, the plurality of sets of cross features, the positive training samples, the negative training samples, or the like, or any combination thereof. In some embodiments, the storage module 310 may store one or more programs and/or instructions that may be executed by the processor(s) of the processing engine 112 to perform exemplary methods described in this disclosure. For example, the storage may store program(s) and/or instruction(s) that may be executed by the processor(s) of the processing engine 112 to cause the online-to-offline service system 100 or a portion thereof to recommend a destination based on a service request, etc. In some embodiments, the storage module 310 may store one or more algorithms to be employed by the processing module 308. The one or more algorithms may include a logistic regression (LR) algorithm, a gradient boosting decision tree (GBDT) algorithm, a random forest (RF) algorithm, or an XGboost algorithm, etc. In some embodiments, the storage module 310 may include a mass storage. For example, the mass storage may include a magnetic disk, an optical disk, a solid-state drive, etc.

The modules of the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined into a single module, any one of the modules may be divided into two or more units. For example, the acquisition module 302 may be integrated into the feature generating module 306 as a single module. The integrated module may both obtain historical data of historical orders and determine a destination prediction model based on the historical data.

Figure 4:
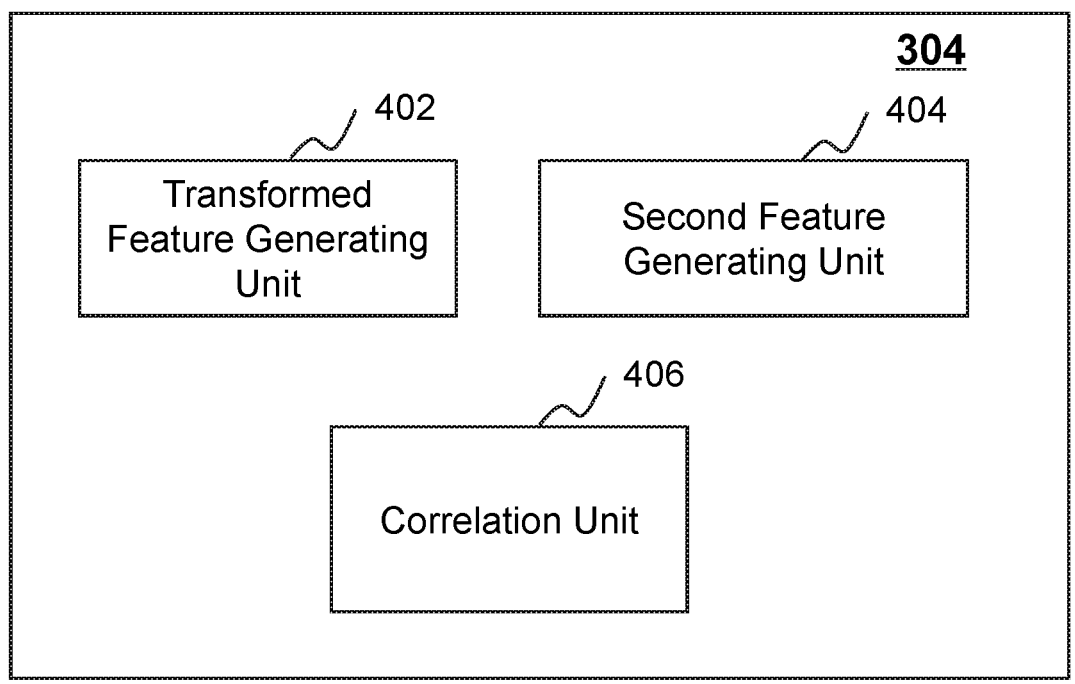
FIG. 4 is a block diagram illustrating an exemplary feature generating module according to some embodiments of the present disclosure.

FIG. 4 is a block diagram illustrating an exemplary feature generating module 304 according to some embodiments of the present disclosure. The feature generating module 304 may include a transformed feature generating unit 402, a second feature generating unit 404, and a correlation unit 406. Each unit may be a hardware circuit that is designed to perform the following actions, a set of instructions stored in one or more storage media, and/or a combination of the hardware circuit and the one or more storage media.

The transformed feature generating unit 402 may generate a plurality of transformed features based on a plurality of first features of a plurality of historical orders. The transformed feature generating unit 402 may generate the plurality of transformed features using a statistics-based technique. The statistics-based technique may include employing a gradient boosting decision tree (GBDT) model, a random forest (RF) model, an XGboost model, or the like, or any combination thereof. In some embodiments, a transformed feature may include a distance between a start location and a destination, a time point, a time length of each of the plurality of historical orders (e.g., a time length between the time a historical order being initiated and the time the historical order being completed), a frequency of visiting of each location in the plurality of historical orders, a probability of selecting each location in the plurality of historical orders as a destination, or the like, or any combination thereof.

The transformed feature generating unit 402 may identify and/or extract the plurality of first features of the historical orders from the storage 150. In some embodiments, the plurality of first features of the plurality of historical orders may be generated in advance and stored in a storage device (e.g., the storage 150). In some embodiments, first features of a historical order may include the type of start locations in the plurality of historical orders, the type of destinations in the plurality of historical orders, a distance feature representing a distance between each start location and each destination, a user profile, or the like, or any combination thereof.

The second feature generating unit 404 may generate a plurality of second features of the plurality of historical orders. The second features may be sparse features. In some embodiments, the plurality of second features of the plurality of historical orders may be generated in advance and stored in a storage device (e.g., the storage 150). The second feature generating unit 404 may identify and/or extract the plurality of second features of the historical orders from the storage 150. In some embodiments, second features of one of a historical order may include user ID, start location ID, destination ID (also referred to as POI ID), or the like, or any combination thereof.

The correlation unit 406 may generate a plurality of sets of cross features based on the plurality of second features. The correlation unit 406 may correlate the plurality of second features to generate the plurality of sets of cross features. For example, the correlation unit 406 may correlate two second features (e.g., a user ID and a POI ID) associated with a historical order to generate a cross feature associated with the historical order. The cross feature may indicate a correlation between the two second features. In some embodiments, the set of cross features may include a cross feature related to a correlation between a starting time and a destination ID, a cross feature related to a correlation between a destination ID and a start location ID, a cross feature related to a correlation between a destination ID and a starting time, a cross feature related to a correlation between a destination ID, a start location ID and a starting time, or the like, or a combination thereof.

The units of the feature generating module 304 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the units may be combined into a single unit, any one of the units may be divided into two or more blocks. For example, the second feature generating unit 404 may be integrated into the correlation unit 406 as a single unit. The integrated unit may both generate second features and correlate the second features and/or the first features to generate the plurality of sets of cross features.

Figure 5:
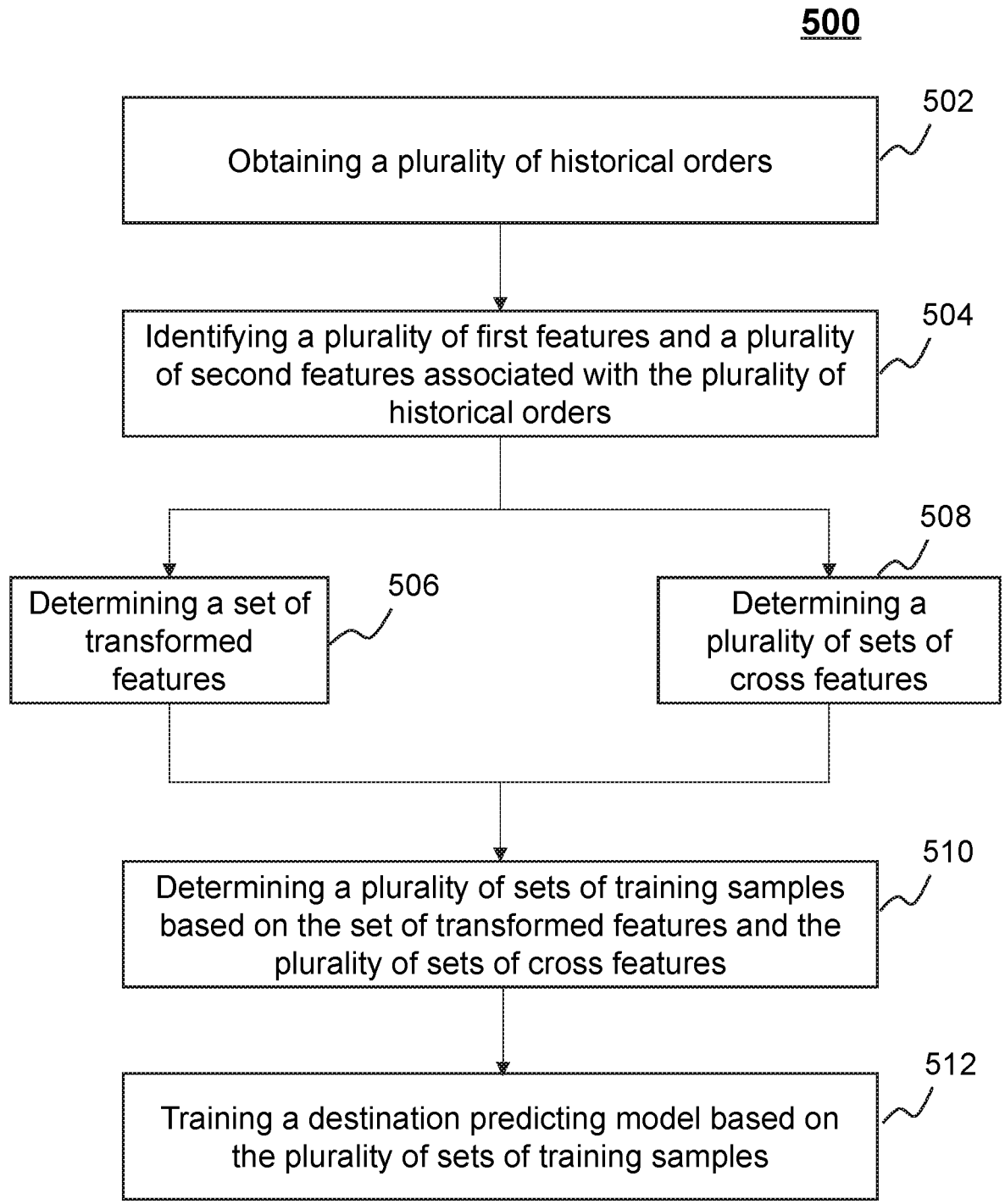
FIG. 5 is a flowchart illustrating an exemplary process for training a destination prediction model according to some embodiments of the present disclosure.

FIG. 5 is a flowchart illustrating an exemplary process for training a destination prediction model according to some embodiments of the present disclosure. In some embodiments, the process 500 may be executed by the online-to-offline service system 100. For example, the process 500 may be implemented as a set of instructions (e.g., an application) stored in storage 150, storage ROM 230, and/or RAM 240. The processing engine 112 may execute the set of instructions, and when executing the instructions, it may be configured to cause the server 110 to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 502, the processing engine 112 (e.g., the acquisition module 302) may obtain a plurality of historical orders corresponding to a plurality of users. The plurality of historical orders may be generated based on online-to-offline service requests and stored in a storage (e.g., the storage 150). The historical orders may be the orders completed within a time period. The time period may be manually set by a user or automatically set by the processing engine 112. The time period may be a day, a week, a month, etc.

Alternatively, a preset number of the latest historical orders (e.g., 100, 500, 1000, 10000) may be recorded. The plurality of historical orders may be categorized based on the geographic locations (e.g., district, city, state) that the historical orders occurred (e.g., the destinations and/or start locations of the orders), the times when the orders were initiated or completed (e.g., morning, afternoon, night, weekend, weekday, holiday), users (e.g., occupation, age), the payment values associated with the orders, or the like, or any combination thereof.

A historical order may include user information, route information, time information, or the like, or a combination thereof. The user information may relate to one or more users requesting or providing the historical order. The user information may include the age, occupation, and/or gender of the user. The user information may also include the address of a point of interest (POI), a frequency of visiting a POI, or the like, or any combination thereof. The route information may relate to one or more routes in the historical order. The route information of a historical order may include the start location(s), the destination(s), the total distance(s) from the start location(s) to the destination(s), the length(s) of congestion on the one or more routes (e.g., the congestion during rush hours), the road condition(s), the traffic light information of the one or more routes (e.g., the number of traffic light, the time length of each traffic light), toll information, or the like, or a combination thereof. The time information of a historical order may include the starting time, the actual time of arrival (ATA), the estimated time of arrival (ETA), the completion time of the historical order, the total time length of the historical order, or the like, or a combination thereof.

In some embodiments, the processing engine 112 may receive an electrical signal encoding the information of the plurality of historical orders from the requester terminal(s) 130 and/or the server 110. For example, the requester terminal 130 (e.g., a smartphone) may transmit the electrical signal to the processing engine 112 via an application installed in the requester terminal 130. In some embodiments, the requester terminal 130 and/or the server 110 may transmit the electrical signal to the processing engine 112 via a wireless connection or a wired connection. Alternatively, the processing engine 112 may obtain the date of the historical orders associated with the electrical signals from the storage 150.

In 504, the processing engine 112 (e.g., the feature generating module 304) may identify a plurality of first features associated with the plurality of historical orders and a plurality of second features associated with the plurality of historical orders. For example, the processing engine 112 may identify and/or extract a plurality of first features and a plurality of second features based on the user information, the route information, the time information, or the like, or a combination thereof. In some embodiments, the first features of many of the users may be similar or the same, while the second features of most of the users may be different from each other. In some embodiments, the first features may be dense features, and the second features may be sparse features. A sparse feature may be a feature in which most of the elements of the feature are zeros, while a dense feature may be a feature in which most of the elements of the feature are not zero. In some embodiments, a feature may be designated as a dense feature or a sparse feature according to the density (or the sparsity) of the feature. The density of the feature may be defined as the number of non-zero elements of the feature (or the matrix corresponding to the feature) divided by the total number of the elements of the feature (or the matrix corresponding to the feature). The sparsity of the feature may be defined as the number of zero-valued elements of the feature (or the matrix corresponding to the feature) divided by the total number of elements of the feature (or the matrix corresponding to the feature). The sum of the sparsity and the density of a feature may be 1. For example, a feature may be designated as a sparse feature if the sparsity of the feature is greater than a sparsity threshold (or the density of the feature is less than a density threshold). A feature may be designated as a dense feature if the sparsity of the feature is less than or equal to the sparsity threshold (or the density of the feature is greater than or equal to the density threshold). Merely by way of example, the sparsity threshold may be any numerals between 0 and 1, such as 0.95, 0.80, 0.65, 0.50, 0.35, 0.20, 0.05, etc. Accordingly, the density threshold may be 0.05, 0.20, 0.35, 0.05, 0.65, 0.80, 0.95, etc. For a dense feature, every value of the dense feature may be stored in a storage (e.g., storage 150, storage ROM 230 and/or RAM 240). For a sparse feature, only non-zero value(s) is/are stored.

In some embodiments, the first features may include a type of start locations in the plurality of historical orders (e.g., whether it's a school or a shopping mall), a type of destinations in the plurality of historical orders, a distance feature representing a distance between each start location and each destination, a user profile, or the like, or any combination thereof.

The start location may be a resident, a company, a gym, a restaurant, a shopping mall, a beauty salon, a school, etc. The destination may be a resident, a company, a gym, a restaurant, a shopping mall, a beauty salon, a school, etc. The user profile may include the age, gender, occupation, or the like, or any combination thereof, of the user.

In some embodiments, the first features may relate to the destinations of the historical orders. For example, a historical order started at 09:00 on a weekday with a residential address as the start location of may correspond to a destination being a company, while a historical order started at 09:00 on a weekend with a residential address as the start location may correspond to a destination being a shopping mall. In some embodiments, the relationship between the plurality of first features and the destinations of the plurality of historical orders may be used to determine an estimated destination (or a candidate destination in a current online-to-offline service request. The estimated destination may be recommended to a user (e.g., a service requester) of the online-to-offline service. For example, the processing engine 112 may determine a destination by inputting the relationship between the plurality of first features and the destinations of the plurality of historical orders into destination prediction model. The determined destination may be transmitted to the requester terminal 130 associated with the user of the service request.

In some embodiments, the plurality of second features may include user ID, start location ID, destination ID (also referred to as POI ID), or the like, or any combination thereof. A user ID may correspond to a user. For example, each user may have a unique identification including a phone number, a nickname, a Wechat number, an Alipay account, ID card number, or the like, or a combination thereof. A user may be identified based on the unique identification. A location ID (e.g., a start location ID, a destination ID) may correspond to a location with a unique name and/or geographic location, and may each be identified based on the corresponding name and geographic location. For example, the processing engine 112 may divide an area into multiple rectangular or hexagonal blocks based on geographic locations (e.g., longitudes and latitudes) and designate a location ID for each block in the area.

In some embodiments, the plurality of second features may relate to the destinations of the plurality of historical orders. For example, historical orders of users A, B, and C with the same start location X may correspond to the same destination Y. However, a historical order of user D with a start location X may correspond to a destination Z. Hence, even if the start locations (and/or the time) are the same for multiple different users, the users may aim for different destinations due to their different second features. In some embodiments, the second features of a particular user may be different from other users and may be ignored when the features are extracted from the historical orders by a general model like a GBDT model. Hence, a correlation between the second features of the particular user may be generated and inputted into a destination prediction model to generate a correct destination with the consideration of the second features.

In 506, the processing engine 112 (e.g., the feature generating module 304) may determine a plurality of transformed features based on the plurality of historical orders. For example, the processing engine 112 may determine a set of transformed features based on the first features of the historical orders. In some embodiments, the plurality of transformed features may be generated using a statistics-based technique. The statistics-based technique may include employing a gradient boosting decision tree (GBDT) model, a random forest (RF) model, an XGboost model, or the like, or any combination thereof. For example, as illustrated in FIGS. 7-A, 7-B, 7-C, 7-D and/or 7-E, the processing engine 112 may use a tree model to generate a plurality of transformed features based on the plurality of first features.

FIG. 7-A is a scatter plot illustrating exemplary training data of a tree model according to some embodiments of the present disclosure. As illustrated in FIG. 7-A, the horizontal axis of the scatter plot 700 represents the user age, and the vertical axis of the scatter plot 700 represents the distance from the starting location to the destination. In some embodiments, training data 710 (e.g., point 710-A, point 710-B) may be obtained based on a plurality of historical orders. For example, a device in the online-to-offline service system 100 (e.g., the processing engine 112) may obtain a plurality of historical orders. Each of the plurality of historical orders may include a plurality of first features (e.g., the type of start locations in the plurality of historical orders, the type of destinations in the plurality of historical orders, a distance feature representing a distance between each start location and each destination, a user profile). In some embodiments, the device may extract the user age and distance from the starting location to the destination from the plurality of historical orders and generate the training data 710 based on the extracted information. In some embodiments, the training data 710 may be in the form of points, tables, relationships, graphs, etc. Alternatively, the training data 710 may be in the form of electronic signals. The device may train a tree model (also referred to as a transforming sub-model, where the transforming model includes multiple tree models or transforming sub-models) based on the training data 710 and the tree model may generate a plurality of internal parameters or structures (e.g., a tree) in response to the training data 710. Then when a value representing the user age is inputted into the trained tree model, the tree model may output a corresponding estimated distance between the start location and the destination. In some embodiments, the trained tree model trained by training data 710 may be combined with other trained tree models. For example, a plurality of transforming sub-models may be trained. Each of the trained transforming sub-models may include different split rules associated with the plurality of first features used to determine a corresponding destination. The plurality of destination prediction sub-models may be combined to generate a transforming model. The transforming model may be a hybrid model that may generate a plurality of transformed features based on an input of multiple first features.

FIG. 7-B is a schematic diagram illustrating the structure of an exemplary tree model according to some embodiments of the present disclosure. As illustrated in FIG. 7-B, a tree model 720 may be generated by a device of the online-to-offline service system 100 based on the training data 710 in connection with FIG. 7-A. The tree model 720 may include a root node 730 which corresponds to a feature of the training data (e.g., user age). The root node 730 may be split into a plurality of leaf nodes 740 (e.g., leaf nodes 740-A, 740-B, and 740-C). Each of the leaf nodes 740 may be generated based on a split rule related to features of the training data 710. For example, leaf node 740-A may be obtained based on a split rule that user age is smaller than or equal to a. In some embodiments, the device may generate a prediction value (e.g., A, B, and C) for each of the leaf node 740. The prediction value may correspond to the other feature of the scatter plot 700 (e.g., the distance between the start location and destination).

FIG. 7-C is a schematic diagram illustrating exemplary training data of a tree model and a trained tree model according to some embodiments of the present disclosure. In some embodiments, the training data 750 may be the same as training data 710 and the segments 760 (also referred to as steps) may correspond to the leaf nodes 740. For example, split positions a and b may correspond to the values in split rules (e.g., user age). The height (or value on the vertical axis) in each segment (e.g., A, B, and C) may correspond to a prediction value in connection with FIG. 7-B.

In some embodiments, a tree model may be split based on a plurality of split rules, and each split rule may correspond to particular split positions and prediction values. Each split rule may also correspond to particular segments. For example, FIG. 7-D and FIG. 7-E may each correspond to a trained tree model by a split rule other than the split rule in FIG. 7-B. In some embodiments, an optimal split rule may be selected from the plurality of split rules. More particularly, the optimal split rule may be determined based on an objective function as follows:

$$\mathrm{obj}(\Theta) = L(\Theta) + \Omega(\Theta), \quad (1)$$

where $\mathrm{obj}(\Theta)$ denotes an objective function, $L(\Theta)$ denotes a training loss that measures how well the tree model fits on the training data, and $\Omega(\Theta)$ denotes a regularization that measures the complexity of the tree model.

In some embodiments, the optimal split rule may have the smallest value of the objective function $\mathrm{obj}(\Theta)$. As illustrated in FIG. 7-D, 770 may have an excess amount of segments. The segments in 770 may have a good fitting on the training data (e.g., a small $L(\Theta)$) but may be too complex (e.g., a big $\Omega(\Theta)$), and thus result in a big value of the objective function. On the other hand, as illustrated in FIG. 7-E, 780 may not have sufficient segments to describe the trend of the training data. The segments in 780 may be simple (e.g., a small $\Omega(\Theta)$) but have sub-optimal fitting on the training data (e.g., a big $L(\Theta)$), and thus also result in a big value of the objective function. As illustrated in FIG. 7-C, as the segments 760 have a good balance between the degree of fitting and the complexity, the $\Omega(\Theta)$ and $L(\Theta)$ may both be reasonably small. Thus, the value of objective function of the tree model 720 split in a split rule illustrated in FIG. 7-C may be small, and the split rule of the tree model in FIG. 7-C may be selected as the optimal split rule. The tree model 720 may be split based on the optimal split rule, and a trained tree model may be generated.

It should be noted that the above description is merely provided for the purposes of illustration, and not intended to limit the scope of the present disclosure. For persons having ordinary skills in the art, various variations and modifications may be conducted under the teaching of the present disclosure. For example, the training data 710 may be generated based on other features. As another example, the tree model may be split based on split rules other than those illustrated in FIG. 7-C, FIG. 7-D, and FIG. 7-E, and a split rule that is better than FIG. 7-C may exist and be selected as the optimal split rule. As a further example, each of the leaf nodes may be further split into a plurality of leaf nodes. However, those variations and modifications may not depart the protection scope of the present disclosure.

The plurality of transformed features may be stored in matrices. Each of the plurality of transformed features may include multiple feature items stored in columns and/or rows of a corresponding matrix. For example, a transformed feature may include the distance between the start location and destination, a time point, the time length of each of the plurality of historical orders (e.g., the time length between the time a historical order being initiated and the time the historical order being completed), the frequency of visiting of each location in the plurality of historical orders, the probability of selecting each location in the plurality of historical orders as the destination, or the like, or any combination thereof. The descriptions of exemplary transformed features and feature items may be found elsewhere in present disclosure (e.g., a transformed feature 814 and feature items 814-1, 814-2, . . . , 814-6 illustrated in FIG. 8, and the descriptions thereof herein).

Figure 8:
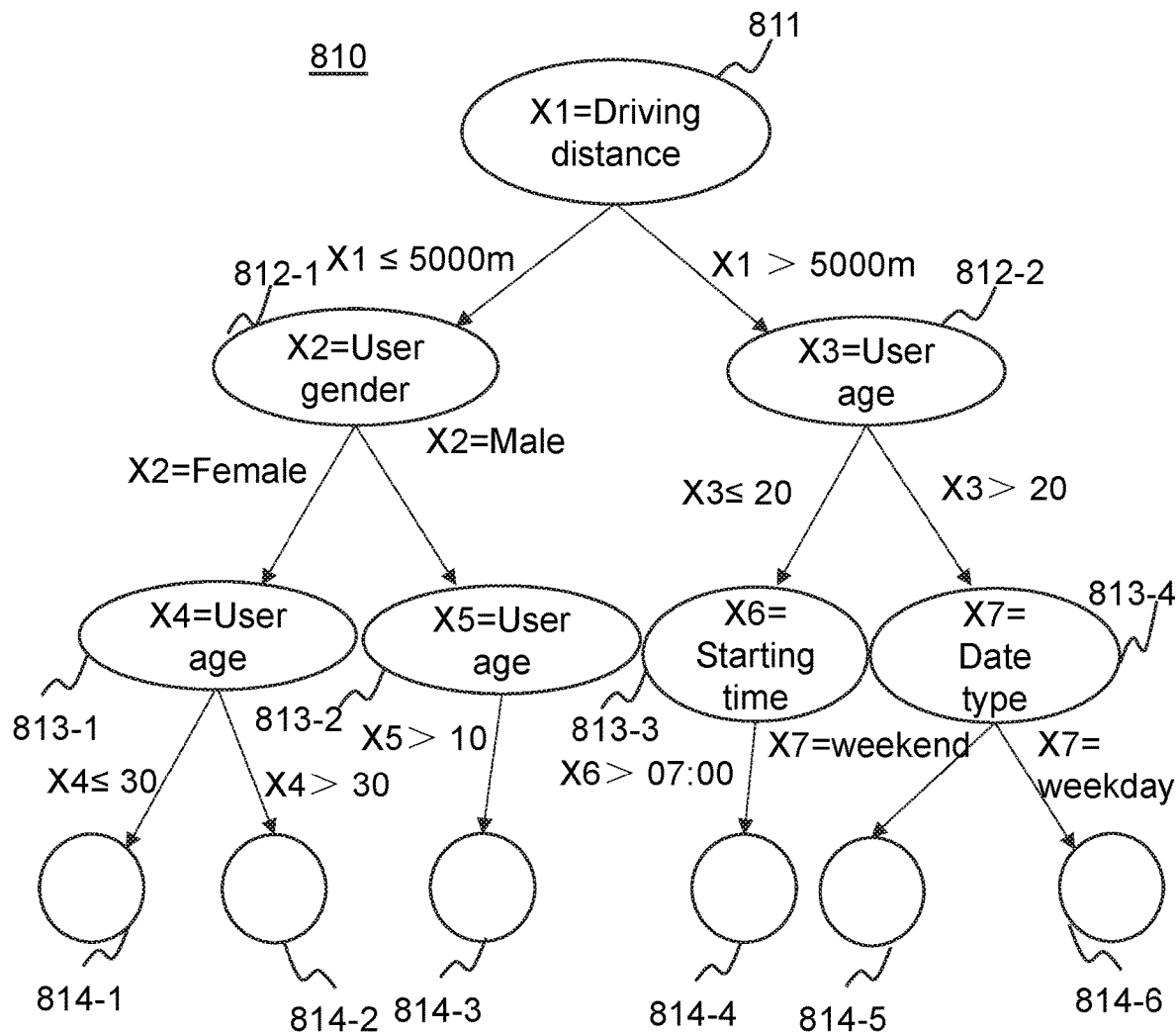
FIG. 8 is a schematic diagram illustrating the structure of an exemplary tree model according to some embodiments of the present disclosure.

FIG. 8 is a schematic diagram illustrating the structure of an exemplary tree model according to some embodiments of the present disclosure. In some embodiments, a tree model 810 may be a trained tree model or a part thereof. As described elsewhere in the present disclosure, the tree model 810 may be combined with other tree models (not shown) to generate a transforming model. The tree model 810 may output a plurality of transformed features in response to the inputs of a plurality of first features.

As illustrated in FIG. 8, a root node 811 may be related to a first feature (e.g., a driving distance). The root node 811 may be split by the tree model 810 into a plurality of leaf nodes 812 (e.g., leaf node 812-1 and leaf node 812-2). Each of the plurality of leaf nodes 812 may be obtained based on a split rule related to the first feature. For example, leaf node 812-1 may be obtained based on a split rule that the driving distance is less than or equal to 5000 m. In other words, training samples of the tree model 810 with driving distance less than or equal to 500 m may be classified into the leaf node 812-1. Similarly, the leaf node 812-2 may be obtained based on a split rule that the driving distance is greater than 5000 m.

In some embodiments, the plurality of leaf nodes 812 may each relate to another first feature. For example, the leaf node 812-1 is related to user gender and the leaf node 812-2 is related to user age. Each of the leaf nodes 812 may be further split into a plurality of leaf nodes 813 based on a split rule related to the corresponding first feature. For example, the leaf node 812-1 may be split into a leaf node 813-1 and a leaf node 813-2 based on a split rule related to the user gender (e.g., whether the training sample is associated with a female user or a male user). The leaf node 812-2 may be split into a leaf node 813-3 and a leaf node 813-4 based on a split rule related to the user age (e.g., whether the age of the user associated with the training sample is more than 20 or less than or equal to 20). Each of the leaf nodes 813 may be further split into a plurality of leaf nodes 814 (also referred to as feature items) based on a split rule related to the corresponding feature. For example, the leaf node 813-1 may be split into a leaf node 814-1 and a leaf node 813-4 based on a split rule related to the user age (e.g., whether the user associated with the training sample is more than 30 or less than or equal to 30). Similarly, the leaf node 813-2 may be split into a leaf node 814-3 based on a split rule related to the user age (e.g., whether the user associated with the training sample is more than 10). The leaf node 813-3 may be split into a leaf node 814-4 based on a split rule related to the starting time (e.g., whether the starting time is later than 07:00). The leaf node 813-4 may be split into a leaf node 814-5 and a leaf node 814-6 based on a split rule related to the type of the day (e.g., whether the day is a weekend or a weekday).

In some embodiments, each leaf node may include a binary vector representing whether the state of a first feature satisfying a split rule (e.g., "1" may represent the state of feature satisfying the split rule, "0" may represent the state of the feature not satisfying the split rule). In response to a training sample associated with a historical order having a driving distance of 2035 m, a user gender of female and a user age of 35, the tree model 810 may output a transformed feature as [0, 1, 0, 0, 0, 0]. Each "0" or "1" value in the transformed feature may correspond to a feature item.

Referring back to FIG. 5, in 508, the processing engine 112 (e.g., the feature generating module 304) may determine a plurality of sets of cross features based on the plurality of historical orders. For example, as illustrated in FIGS. 9-A and 9-B, the processing engine 112 may determine a plurality of sets of cross features based on the plurality of first features and the plurality of second features.

FIG. 9-A is a schematic diagram illustrating exemplary correlations between a plurality of features according to some embodiments of the present disclosure. As shown in FIG. 9-A, features 901 (e.g., features 901-1, 901-2, 901-3 shown as triangles) may each correspond to a second feature (e.g., a user ID, a start location ID) described elsewhere in the present disclosure. Features 902 (e.g., features 902-1, 902-2, 902-3 shown as circles) may each correspond to a first feature (e.g., a starting time) or a second feature (e.g., a destination ID) described elsewhere in the present disclosure. Each of lines connecting the features 901 and 902 may be associated with a historical order in which the corresponding features 901 and 902 are involved. Merely by way of example, the features 901 may correspond to three different user IDs (e.g., a first user ID 901-1, a second user ID 901-2, and a third user ID 901-3). The features 902 may correspond to three different destination IDs (e.g., a first destination ID 902-1, a second destination ID 902-2, and a third destination ID 902-3). FIG. 9-A illustrates that the first destination ID 902-1 and the second destination ID 902-2 are each involved in three historical orders, while the third destination ID 902-3 is only involved in one historical order (i.e., with the first user ID 901-1). In some embodiments, a third destination represented by the third destination ID 902-3 may be omitted when the processing engine 112 identifies and/or extracts a plurality of first features because the third destination is less popular than other destinations in the plurality of historical orders. However, the data illustrating that the first user has visited all three destinations may indicate that the third destination may also be important for the first user and may be considered when recommending a destination to the first user. Therefore, a cross feature (e.g., a cross feature 903-1) may be generated by correlating the first user ID 901-1 and the third destination ID 902-3 to prevent the omission of third destination ID 902-3.

FIG. 9-B is a schematic diagram illustrating cross features according to some embodiments of the present disclosure. As shown in FIG. 9-B, the cross feature 903 may be associated with a historical order including the first user ID 901-1 and the third destination ID 902-3 and expressed as follows:

cross feature 903-1=first user ID 901-1*third destination ID 902-3. (2)

Similarly, a cross feature 903-2 may be generated based on a historical order including the first user ID 901-1 and the second destination ID 902-2 and expressed as follows:

cross feature 903-2=first user ID901-1*second destination ID 902-2. (3)

Referring back to 508 in FIG. 5, a plurality of second features may be correlated to generate a plurality of sets of cross features. Each set of cross features may correspond to a historical order. Different cross features in a set of cross features may be different correlations between or among the second features. In some embodiments, the processing engine 112 may correlate one or more first features with one or more second features to generate a cross feature. For example, the processing engine 112 may correlate a starting time and a destination ID to generate a cross feature related to a correlation between the starting time and the destination ID. Similarly, the processing engine 112 may generate a cross feature related to a correlation between a destination ID and a start location ID, a cross feature related to a correlation between a destination ID and a starting time, a cross feature related to a correlation between a destination ID, a start location ID and a starting time, or the like, or a combination thereof.

In 510, the processing engine 112 (e.g., the model training module 304) may determine a plurality of sets of training samples based on the set of transformed features and the plurality of sets of cross features. Each set of training samples may correspond to a particular destination. For example, a plurality of historical orders may have a real destination A. A real destination used herein refers to the final destination of a historical order. The processing engine 112 may generate a plurality of positive training samples and a plurality of negative training samples based on a plurality of historical orders. For example, each of positive training samples corresponding to the plurality of historical orders may have a destination A. Each of negative training samples corresponding to the plurality of historical orders may have a destination different from A (e.g., destination B or C). In some embodiments, a label "1" may be assigned to each of the positive training samples, and a label "0" may be assigned to each of the negative training samples. The processing engine 112 may train the destination prediction model based on the positive training samples and the negative training samples, together with their labels. Detailed process and/or method of generating a plurality of sets of training samples is described elsewhere in this disclosure (e.g., in connection with FIG. 6).

In 512, the processing engine 112 (e.g., the model training module 306) may train a destination prediction model based on the plurality of sets of training samples. For example, the processing engine 112 may obtain the plurality of sets of training samples from the feature generating module 304 and train a destination prediction model based on the plurality of sets of training samples in the model training module 306. In some embodiments, the destination prediction model may be stored in a storage device as an application or a part thereof, which may be used in a user terminal (e.g., a requester terminal) or an online platform (e.g., a server). In some embodiments, the destination prediction model may be configured to recommend one or more destinations related to an online-to-offline service application or a navigation service application. For example, a service requester may initiate a service request in a navigation service application without inputting any destination, and the navigation service application may auto-fill a recommended destination for the user.

In some embodiments, the destination prediction model may be determined by the processing engine 112 (e.g., the model training module 306). Alternatively, the destination prediction model may be determined by another computing device inside or outside the online-to-offline service system 100, and the processing engine 112 may obtain the destination prediction model from another computing device (or a storage device that stores the destination prediction model). For brevity, only the processing engine 112 is used to describe the process of determining the destination prediction model, but one having ordinary skills in the art would understand that a different processor may execute the similar process described herein.

Figure 10:
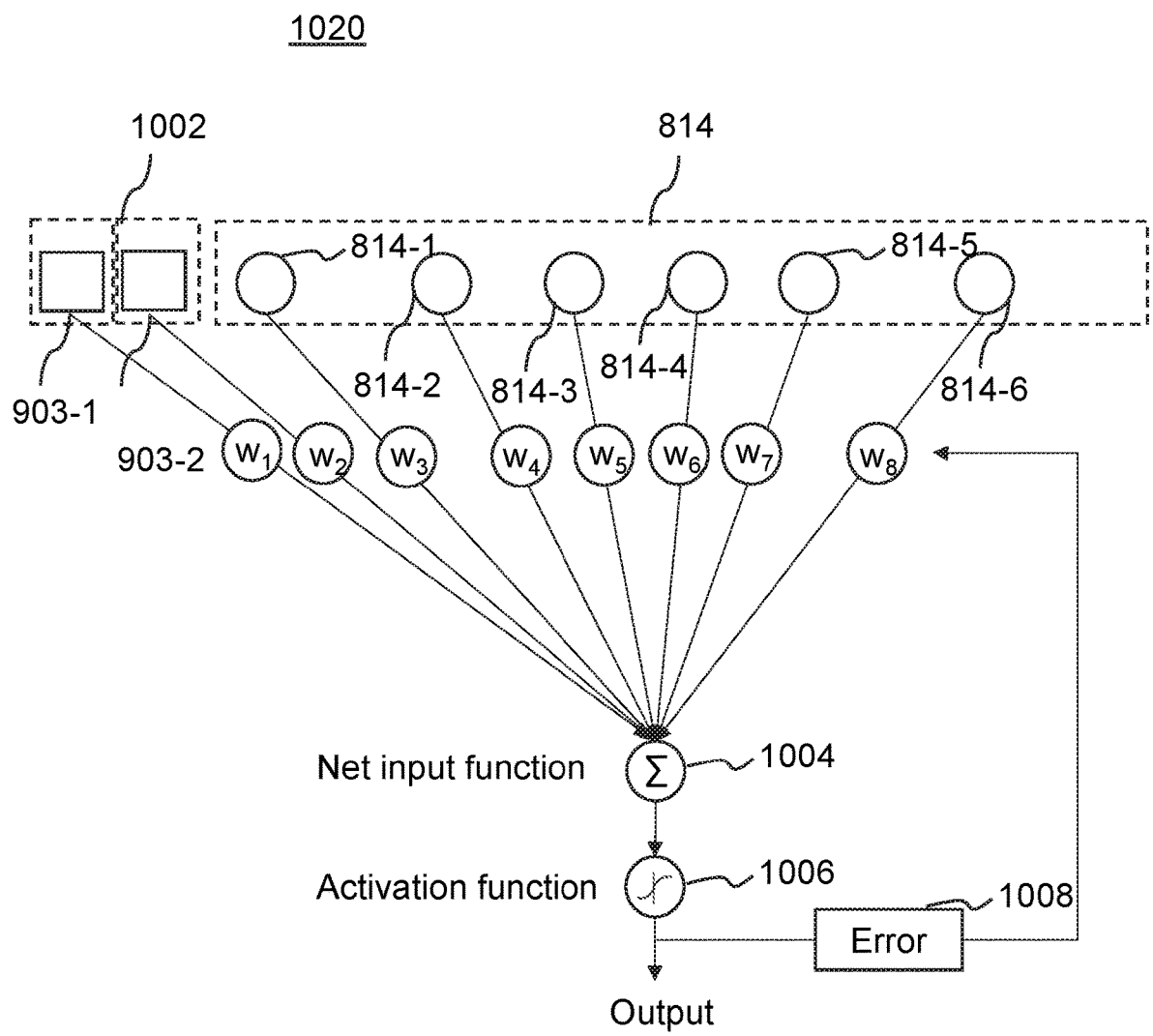
FIG. 10 is a schematic diagram illustrating the structure of an exemplary Logistic Regression model according to some embodiments of the present disclosure.

In some embodiments, the destination prediction model may include a plurality of destination prediction sub-models. Each of the plurality of destination prediction sub-models may correspond to a particular destination. FIG. 10 is a schematic diagram illustrating the structure of a destination prediction sub-model according to some embodiments of the present disclosure. In some embodiments, the destination prediction sub-model 1020 may be a logistic regression (LR) model in training. As described elsewhere in the present disclosure, the destination prediction sub-model 1020 may be combined with other models (e.g., a plurality of destination prediction sub-models, a transforming model) by a device (e.g., the processing engine 112) of the online-to-offline service system 100 to determine one or more destinations.

As illustrated in FIG. 10, inputs of the destination prediction sub-model 1020 may include a plurality of feature items. The plurality of feature items may include a set of the cross features 1002 and a transformed feature 814 (e.g., each feature item may correspond to a cross feature or a leaf node of a transformed feature). Optionally, the inputs of the destination prediction sub-model 1020 may further include the label(s) of the plurality of feature items. The plurality of feature items may be associated with a historical order. The set of the cross features 1002 may include one or more cross features (e.g., cross feature 903-1 $x_1$, cross feature 903-2 $x_2$). In some embodiments, each of the set of the cross features 1002 may be associated with a destination ID. For example, the cross feature 903-1 may be associated with a destination ID and a user ID, and the cross feature 903-2 may be associated with the destination ID, a starting time and a start location. As disclosed elsewhere in the present disclosure, the transformed feature 814 may be determined using a transforming model (e.g., in connection with FIG. 8) based on a plurality of first features. The transformed feature 814 may include a plurality of leaf nodes (e.g., leaf node 814-1 $x_3$, leaf node 814-2 $x_4$, leaf node 814-3 $x_5$, leaf node 814-4 $x_6$, leaf node 814-5 $x_7$, and leaf node 814-6 $x_8$).

Each of the set of the cross features 1002, and each leaf node of the transformed feature 814 may be associated with one of a plurality of weights (e.g., $w_1$, $w_2$, $w_3$, $w_4$, $w_5$, $w_6$, $w_7$, $w_8$). The value of a corresponding weight of a feature item may indicate how good the feature item is at predicting the output (e.g., a destination) of the destination prediction model.

A net input function 1004 may be generated based on the inputs and the corresponding weights. The net input function 1004 may be a linear combination of the set of the cross features 1002 and the transformed feature 814 with the plurality of corresponding weights. For example, the processing engine 112 may determine the net input function 1004 as:

$$\text{net}(x) = b + \sum_{i=1}^{n} w_i x_i, \tag{4}$$

where net(x) denotes the net input function 1004; i (i=1, 2, . . . , n) denotes the sequence of x; n denotes the number of feature items of the inputs; $x_i$ denotes $i_{th}$ feature item of the inputs; b denotes a constant parameter; and $w_i$ denotes a weight of $x_i$.

An activation function 1006 may be generated based on the net input function 1004. For example, the processing engine 112 may determine the activation function 1006 as:

$$\emptyset(z) = \frac{1}{1 + e^{-net(x)}}, \tag{5}$$

where ø(z) denotes the activation function 1006; and net(x) denotes the net input function 1004. An error 1008 may be generated based on the activation function 1006. The error 1008 may be configured to evaluate the performance of the destination prediction sub-model 1020. In some embodiments, the plurality of weights 814 (e.g., $w_1$, $w_2$, . . . , $w_8$) may be adjusted based on the error 1008. The processing engine 112 may determine a destination based on the value of activation function 1006 ø(z).

Referring back to FIG. 5, the information associated with an online-to-offline service request may be inputted into the destination prediction model, and each of the plurality of destination prediction sub-models may output a probability that a user of the online-to-offline service request selects the particular destination corresponding to the destination prediction sub-model as his or her destination. The processing engine 112 may further generate one or more destinations as an output of the destination prediction model based on the probabilities corresponding to different destinations generated by the plurality of destination prediction sub-models. Detailed descriptions of the exemplary process of determining one or more destinations for an online-to-offline service request may be found elsewhere in this disclosure (e.g., FIG. 11 and the descriptions thereof).

Take a first destination prediction sub-model corresponding to a destination A as an example; the first destination prediction sub-model may include a linear classifier. For example, the first destination prediction sub-model may be a Logistic Regression (LR) model corresponding to the destination A and may be trained based on a set of training samples corresponding to the destination A. The set of training samples corresponding to the destination A may include a plurality of transformed features and a plurality of sets of cross features. In some embodiments, a training sample may include a transformed feature and a set of cross features, and may be expressed as:

$$x = [a, b_1, b_2, \ldots, b_n], \tag{6}$$

where a denotes a vector representing multiple feature items of the transformed feature; $b_i$ denotes an $i^{th}$ cross feature of the set of cross features b; and n denotes the number of cross features in the set of cross features.

The processing engine 112 may determine the set of training samples corresponding to destination A as:

$$D = (x^1, y^1), (x^2, y^2), \ldots, (x^i, y^i), \ldots (x^N, y^N), \tag{7}$$

where D denotes a set of training samples corresponding to destination A; $x^i$ denotes an $i^{th}$ training sample including a transformed feature and a set of cross features; and $y^i$ denotes a label of the $i^{th}$ training sample. The value of $y^i$ may be a label of "0" or "1."

The processing engine 112 may determine an assumption for the LR model as:

$$P(y=1|x;\theta) = g(\theta^T x) = \frac{1}{1+e^{-\theta^T x}}, \quad (8)$$

where $P(y=1|x;\theta)$ represents an assumption for the LR model.

The processing engine 112 may determine a classifier based on the assumption as:

$$y^*=1, \text{ if } P(y=1|x)>c, \quad (9)$$

where y* denotes a classifier; and c denotes a threshold. In some embodiments, the threshold c may be a default setting of the online-to-offline service system 100 (e.g., 0.5), or may be adjustable under different situations. In some embodiments, the processing engine 112 may adjust the threshold based on a predicting accuracy requirement. For example, the value of c may be 0.65 if the predicting accuracy requirement is high. For another example, the value of c may be 0.35 if the predicting accuracy requirement is low.

The processing engine 112 may determine a likelihood of the classifier as:

$$L(\theta)=P(D|\theta)=\Pi P(y|x;\theta), \quad (10)$$

The processing engine 112 may determine a logarithmic likelihood of the classifier as:

$$l(\theta) = \Sigma y \log\left(\frac{1}{1+e^{-\theta^T x}}\right) + (1-y)\log\left(1 - \frac{1}{1+e^{-\theta^T x}}\right), \quad (11)$$

where $l(\theta)$ denotes a logarithmic likelihood of the classifier.

The processing engine 112 may determine a loss function of the classifier as:

$$J(\theta) = -\frac{1}{N}l(\theta), \quad (12)$$

where $J(\theta)$ denotes a loss function, and $l(\theta)$ denotes a logarithmic likelihood of the classifier.

The processing engine 112 may obtain the first destination prediction sub-model corresponding to destination A when the loss function of the LR model reaches a minimum value (e.g., convergence) during the training process. In some embodiments, the processing engine 112 may determine the minimum value of the loss function by using a gradient descent method, a Newton's method, a Broyden-Fletcher-Goldfarb-Shanno (BFGS) algorithm, or the like, or any combination thereof.

For illustration purposes, the present disclosure takes the first destination prediction sub-model as an example; it should be noted that the processing engine 112 may train a plurality of destination prediction sub-models corresponding to different destinations.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
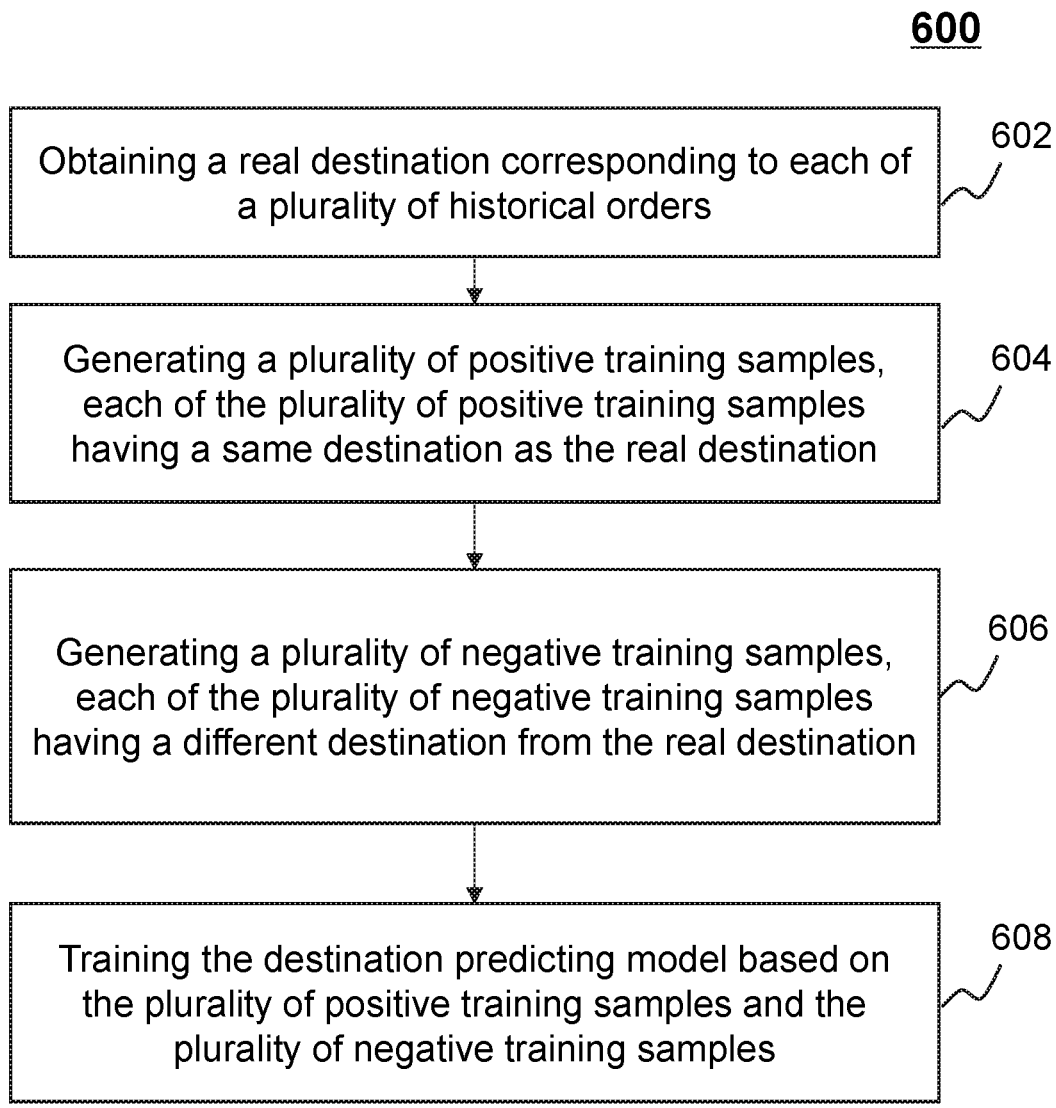
FIG. 6 is a flowchart illustrating an exemplary process for training a destination prediction model according to some embodiments of the present disclosure FIG. 7-A is a schematic diagram illustrating exemplary training data of a tree model according to some embodiments of the present disclosure.

FIG. 6 is a flowchart illustrating an exemplary process for training a destination prediction model according to some embodiments of the present disclosure. In some embodiments, the process 600 may be executed by the online-to-offline service system 100. For example, the process 600 may be implemented as a set of instructions (e.g., an application) stored in storage 150, storage ROM 230, and/or RAM 240. The processing engine 112 may execute the set of instructions, and when executing the instructions, it may be configured to cause the server 110 to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting. In some embodiments, operation 510 of the process 500 may be performed according to the process 600.

In 602, the processing engine 112 (e.g., the acquisition module 302) may obtain a real destination corresponding to each of a plurality of historical orders. The plurality of historical orders may be generated based on a plurality of historical online-to-offline service requests and stored in a storage (e.g., the storage 150). A real destination used herein refers to the final destination of a historical order, that is, the destination that the user chose or entered in that historical order. The real destination may be determined according to a plurality of factors associated with the historical order (e.g., the starting time, the start location, the user).

In 604, the processing engine 112 (e.g., the acquisition module 302) may generate a plurality of positive training samples. Each of the plurality of positive training samples may correspond to one of the plurality of historical orders. Each of the plurality of positive training sample may have the same destination as the real destination of the corresponding historical order. In some embodiments, label "1" may be assigned to each of the plurality of positive training samples.

In some embodiments, the positive training samples may include multiple sets of positive training samples. Each set of the positive training samples may include the same real destination (e.g., the assigned label "1"). For example, if there are 50 different real destinations in the plurality of historical orders, there may be 50 sets of positive training samples. Each historical order associated with a set of positive training samples PTi may have a real destination Di, where 1≤i≤50. Further, each positive training sample may include a transformed feature associated with the corresponding historical order and a set of cross features associated with the corresponding historical order.

In 606, the processing engine 112 (e.g., the acquisition module 302) may generate a plurality of negative training samples. Each of the plurality of negative training samples may correspond to one of the plurality of historical orders. Each of the plurality of negative training sample may have a destination different from the real destination of the corresponding historical order. In some embodiments, label "0" may be assigned to each of the plurality of negative training samples.

In some embodiments, the negative training samples may include multiple sets of negative training samples. In some embodiments, the number of the sets of negative training samples may be the same as the number of the sets of positive training samples. Each set of negative training samples may correspond to a set of positive training samples. For example, if historical order associated with a set of positive training samples PTi has a real destination Di, the historical order associated with a negative training sample NTi corresponding to the set of positive training samples PTi may have real destinations different from the real destination Di. Further, each negative training sample may include a transformed feature associated with the corresponding historical order and a set of cross features associated with the corresponding historical order.

In 608, the processing engine 112 (e.g., the model training module 306) may train the destination prediction model based on the positive training samples and the negative training samples. For example, the processing engine 112 may obtain the positive training samples and/or the negative training samples from the feature generating module 304 and train a destination prediction model based on the positive training samples and/or the negative training samples in the model training module 306. In some embodiments, the destination prediction model may be stored in a storage device as an application or a part thereof, which may be used in a user terminal (e.g., a requester terminal 130) or an online platform (e.g., a server 110). In some embodiments, the destination prediction model may be used to recommend or predict one or more destinations related to an online-to-offline service application or a navigation service application. For example, a service requester may initiate a service request in a navigation service application without inputting any destination, and the navigation service application may automatically fill a recommended destination for the user using the destination prediction model based on various factors (such as a user ID, a current location of the user, a starting time, etc.) as the input to the destination prediction model.

In some embodiments, the destination prediction model may include a plurality of destination prediction sub-models. Each of the plurality of destination prediction sub-model may correspond to a particular destination. The processing engine 112 may input the set of positive training samples PTi and the set of negative training samples NTi into a destination prediction sub-model corresponding to the destination Di, and the destination prediction sub-model corresponding to the destination Di may output a probability that a user of a training sample selecting the destination Di as his or her destination. The trained destination prediction sub-model corresponding to the destination Di may output a probability of 1 (or a relatively high value) for each of the set of positive training samples PTi and a probability of 0 (or a relatively low value) for each of the set of negative training samples NTi.

Figure 11:
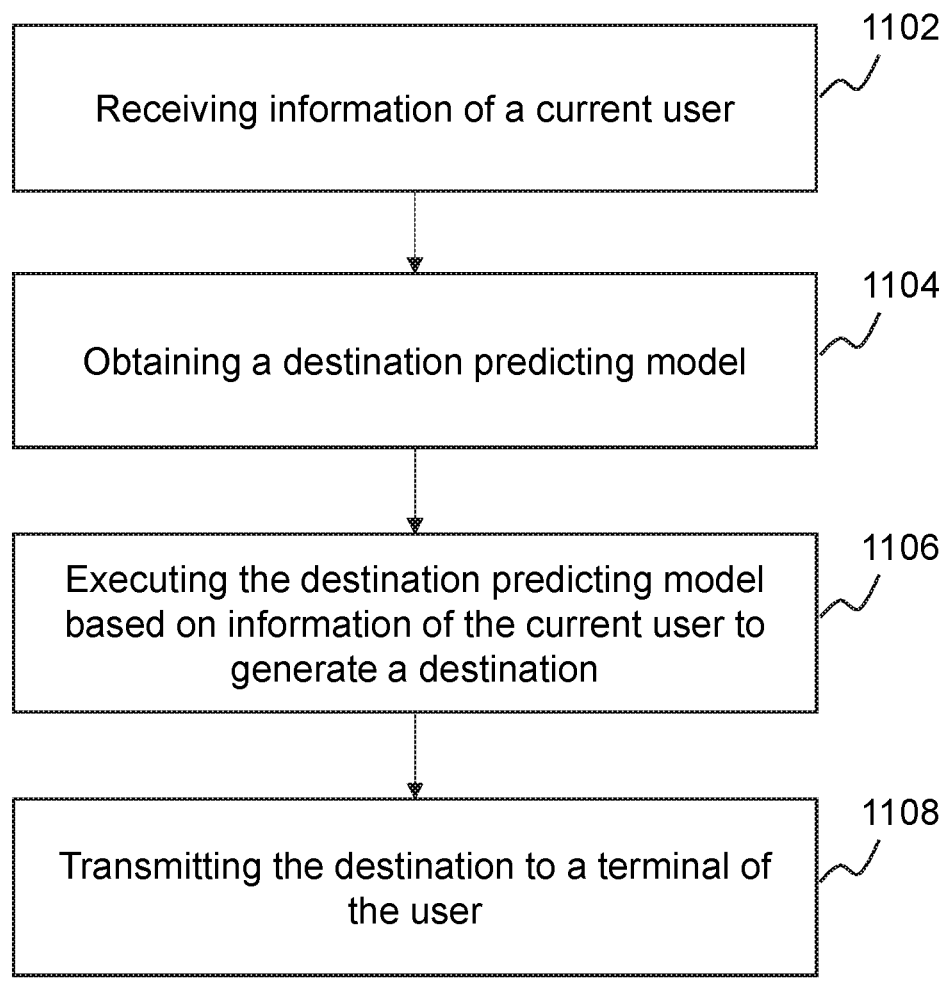
FIG. 11 is a flowchart illustrating an exemplary process for determining a destination for a service request according to some embodiments of the present disclosure.

FIG. 11 is a flowchart illustrating an exemplary process for determining a destination for a service request according to some embodiments of the present disclosure. In some embodiments, the process 1000 may be executed by the online-to-offline service system 100. For example, the process 1100 may be implemented as a set of instructions (e.g., an application) stored in storage 150, storage ROM 230 and/or RAM 240. The processing engine 112 may execute the set of instructions, and when executing the instructions, it may be configured to cause the server 110 to perform the process 1100 in an online-to-offline service platform. The platform may be an Internet-based platform that connects online-to-offline service providers and requesters through the Internet.

In 1102, the processing engine 112 (e.g., the acquisition module 302) may receive information of a current user (e.g., the requester terminal 130). The information of the current user may be associated with a service request that may be sent by a passenger for a taxi hailing service. The information of the current user may include the user ID, the current time, and the current location of the current user. In some embodiments, the current location of the current user may be the current location of a user device associated with the current user (e.g., a requester terminal 130), which may be determined by a GPS unit of the user device (e.g., GPS chipset). The current location of the current user may indicate the start location ID of the service request.

In 1104, the processing engine 112 (e.g., the processing module 308) may obtain a destination prediction model from the model training module 306. In some embodiments, the destination prediction model may be trained based on a plurality of historical orders. The obtained destination prediction model may be generated according to the exemplary process for training a destination prediction model disclosed elsewhere in this application (e.g., the process 500). In some embodiments, the processor that trains the destination prediction model may be different from the processor that uses the destination prediction model. For example, the destination prediction model may first be trained by a remote processor outside the online-to-offline service system 100 and stored in the storage 150. The processing engine 112 may then access the storage 150 to use the trained destination prediction model.

In some embodiments, the destination prediction model may be updated periodically. For example, a transforming model which generates input data (e.g., transformed features) for the destination prediction model may be updated daily, while the destination prediction model may be updated in real time.

In 1106, the processing engine 112 (e.g., the processing module 308) may execute the destination prediction model based on the information of the current user to determine a recommended destination. For example, the processing engine 112 may use the start location ID, the user ID and the current time as the input of the destination prediction model, and the destination prediction model may generate an output of one or more determined destinations according to the input. In some embodiments, the processing engine 112 may further obtain user information based on the user ID. User information may include user age, user gender, user occupation, or the like, or any combination thereof. The processing engine 112 may further use the user information or a portion thereof as the input of the destination prediction model, which may output one or more recommended destinations based on the input.

In some embodiments, the destination prediction model may include a plurality of destination prediction sub-models. Each of the plurality of destination prediction sub-model may correspond to a particular destination. Each of the plurality of destination prediction sub-models may output a probability that a user of a service request selecting the particular destination corresponding to the destination prediction sub-model as his or her destination when information of the service request is inputted into the destination prediction model. The one or more determined destinations may be determined based on the probabilities. For example, destinations with probabilities higher than 80% may be determined as the output of the destination prediction model. The destination prediction model may output the one or more determined destinations in descending order (from high to low) in terms of the probabilities of the one or more determined destinations.

In 1108, the processing engine 112 (e.g., the processing module 308) may transmit the one or more determined destinations to the provider terminal 140, a requester terminal 130, and/or any component of the online-to-offline service system 100 (e.g., the storage 150). The terminal(s) may display the one or more determined destinations in a graphic user interface (GUI). For example, the terminal(s) may display the information of the one or more determined destinations in the GUI in e.g., a descending order of the probabilities, for the user to choose from. The number of destinations displayed in each page may be adjusted based on a preference of the user. In some embodiments, the one or more determined destinations may be displayed in a map in the GUI. Different destinations may be displayed in same or different shapes or colors in the map. The user may click on the display to select one of the one or more determined destination as his/her destination. Detailed information of the selected destination may be further displayed. In response to a determination that the user does not choose any of the displayed destinations as the destination, the terminal(s) may display an input box for the user to manually input the destination. For another example, in response to a determination that the user does not choose any of the displayed destinations as the destination, the terminal(s) may display a map including a current location of the user. The user may manually select a location on the map as the destination. The current location of the user may be determined by a GPS unit (e.g., GPS microchip or chipset) in the user terminal(s). In some embodiments, the determined destination may be sent to the user of the terminal(s). The user of the terminal(s) may decide whether to select the one or more determined destinations as his or her destination for the service request.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A method implemented on a computing device having at least one storage device storing a set of instructions for generating a trained destination prediction model, and at least one processor in communication with the at least one storage device, the method comprising:
   obtaining, by the at least one processor, a plurality of historical orders corresponding to a plurality of users, wherein each of the plurality of users corresponds to at least one of the plurality of historical orders;
   determining, by the at least one processor, a plurality of first features associated with the plurality of historical orders and a plurality of second features associated with the plurality of historical orders;
   determining, by the at least one processor, a plurality of transformed features based on the plurality of first features using a statistics-based technique;
   determining, by the at least one processor, a plurality of sets of cross features by correlating the plurality of second features, wherein each of the plurality of sets of cross features is associated with one of the plurality of users and determined based on the corresponding at least one historical order;
   obtaining, by the at least one processor, a preliminary destination prediction model; and
   training, by the at least one processor, the preliminary destination prediction model to obtain a trained destination prediction model based on the plurality of transformed features and the plurality of sets of cross features using a linear classifier.

2. The method of claim 1, wherein the plurality of first features are dense features and the plurality of second features are sparse features.

3. The method of claim 1, further comprising:
   obtaining information of a current user; and
   determine a candidate destination for the current user according to the destination prediction model based on the information of the current user.

4. The method of claim 3, wherein the information of the current user includes a user identification (ID) and a current location of the current user.

5. The method of claim 1, further comprising:
   obtaining a real destination corresponding to the each of the plurality of historical orders;
   generating a plurality of positive training samples, each of the plurality of positive training samples having a same destination as the real destination, a transformed feature and a set of cross features;
   generating a plurality of negative training samples, each of the plurality of negative training samples having a different destination from the real destination, a transformed feature and a set of cross features; and
   training the destination prediction model based on the plurality of positive training samples and the plurality of negative training samples.

6. The method of claim 1, wherein the plurality of transformed features includes at least one of: a distance between a start location and a destination, a time point, a time length of each of the plurality of historical orders, a frequency of visiting of each location in the plurality of historical orders, or a probability of selecting each location in the plurality of historical orders as a real destination.

7. The method of claim 1, wherein the each of the plurality of sets of cross features is associated with a user ID of the corresponding user and at least one destination ID corresponding to the at least one historical orders associated with the user.

8. The method of claim 7, wherein the determination of each of the plurality of sets of cross features comprises:
   determining a user ID of the corresponding user;
   determining at least one destination ID corresponding to the at least one historical orders associated with the user; and
   correlating the user ID with the at least one destination ID of the user to generate a set of cross features.

9. The method of claim 1, wherein the statistics-based technique includes at least one of a gradient boosting decision tree (GBDT) model, a random forest (RF) model, or an XGboost model.

10. The method of claim 1, wherein the linear classifier includes a logistic regression (LR) model.

11. A system for generating a trained destination prediction model, comprising:
    a storage device storing a set of instructions; and at least one processor of an online-to-offline service platform configured to communicate with the storage device, wherein when executing the set of instructions, the at least one processor is configured to cause the system to:
    obtain a plurality of historical orders corresponding to a plurality of users, wherein each of the plurality of users corresponds to at least one of the plurality of historical orders;
    determine a plurality of first features associated with the plurality of historical orders and a plurality of second features associated with the plurality of historical orders;
    determine a plurality of transformed features based on the plurality of first features using a statistics-based technique;
    determine a plurality of sets of cross features by correlating the plurality of second features, wherein each of the plurality of sets of cross features is associated with one of the plurality of users and determined based on the corresponding at least one historical order;
    obtain a preliminary destination prediction model; and
    train the preliminary destination prediction model to obtain a trained destination prediction model based on the plurality of transformed features and the plurality of sets of cross features using a linear classifier.

12. The system of claim 11, wherein the plurality of first features are dense features and the plurality of second features are sparse features.

13. The system of claim 11, wherein the at least one processor is further configured to cause the system to:
    obtain information of a current user; and
    determine a candidate destination for the current user according to the destination prediction model based on the information of the current user.

14. The system of claim 13, wherein the information of the current user includes a user identification (ID) and a current location of the current user.

15. The system of claim 11, wherein the at least one processor is further configured to cause the system to:
    obtain a real destination corresponding to the each of the plurality of historical orders;
    generate a plurality of positive training samples, each of the plurality of positive training samples having a same destination as the real destination, a transformed feature and a set of cross features;
    generate a plurality of negative training samples, each of the plurality of negative training samples having a different destination from the real destination, a transformed feature and a set of cross features; and train the destination prediction model based on the plurality of positive training samples and the plurality of negative training samples.

16. The system of claim 11, wherein the plurality of transformed features includes at least one of: a distance between a start location and a destination, a time point, a time length of each of the plurality of historical orders, a frequency of visiting of each location in the plurality of historical orders, or a probability of selecting each location in the plurality of historical orders as a real destination.

17. The system of claim 11, wherein the each of the plurality of sets of cross features is associated with a user ID of the corresponding user and at least one destination ID corresponding to the at least one historical orders associated with the user.

18. The system of claim 17, wherein to determine each of the plurality of sets of cross features, the at least one processor is further configured to cause the system to:
   determine a user ID of the corresponding user;
   determine at least one destination ID corresponding to the at least one historical orders associated with the user; and
   correlate the user ID with the at least one destination ID of the user to generate a set of cross features.

19. The system of claim 11, wherein the statistics-based technique includes at least one of a gradient boosting decision tree (GBDT) model, a random forest (RF) model, or an XGboost model.

20. A non-transitory machine-readable storage medium including instructions that, when accessed by at least one processor of an online-to-offline service platform, causes the at least one processor to:
   obtain a plurality of historical orders corresponding to a plurality of users, wherein each of the plurality of users corresponds to at least one of the plurality of historical orders;
   determine a plurality of first features associated with the plurality of historical orders and a plurality of second features associated with the plurality of historical orders;
   determine a plurality of transformed features based on the plurality of first features using a statistics-based technique;
   determine a plurality of sets of cross features by correlating the plurality of second features, wherein each of the plurality of sets of cross features is associated with one of the plurality of users and determined based on the corresponding at least one historical order;
   obtain a preliminary destination prediction model; and
   train the preliminary destination prediction model to obtain a trained destination prediction model based on the plurality of transformed features and the plurality of sets of cross features using a linear classifier.

* * * * *